United States Patent
Patinkin et al.

(10) Patent No.: US 7,916,865 B2
(45) Date of Patent: Mar. 29, 2011

(54) DYNAMICALLY SHIFTING CONTROL WORD

(75) Inventors: Akiva Patinkin, Jersusalem (IL); Stephanie Wald, Givat Zeev (IL); Avraham Poupko, Jerusalem (IL)

(73) Assignee: NDS Limited, Middlesex (GB)

( * ) Notice: Subject to any disclaimer, the term of this patent is extended or adjusted under 35 U.S.C. 154(b) by 0 days.

(21) Appl. No.: 12/156,491

(22) Filed: Jun. 2, 2008

(65) Prior Publication Data

US 2008/0240431 A1  Oct. 2, 2008

Related U.S. Application Data

(62) Division of application No. 10/181,992, filed as application No. PCT/IL01/00434 on May 16, 2001, now Pat. No. 7,397,918.

(60) Provisional application No. 60/206,056, filed on May 22, 2000.

(51) Int. Cl.
*H04N 7/167* (2011.01)
*H04N 7/16* (2011.01)
*H04L 9/00* (2006.01)
*H04L 9/08* (2006.01)
*H04L 29/06* (2006.01)
*G06F 7/04* (2006.01)
*H04N 7/173* (2011.01)

(52) U.S. Cl. ........ 380/239; 380/282; 380/231; 380/277; 725/6; 713/155; 726/28; 726/29; 726/30

(58) Field of Classification Search .............. 380/239, 380/282; 725/6; 713/155
See application file for complete search history.

(56) References Cited

U.S. PATENT DOCUMENTS

| 4,228,321 | A | 10/1980 | Flanagan | 179/1.5 S |
| 4,484,027 | A | 11/1984 | Lee et al. | 178/22.13 |
| 4,531,020 | A | 7/1985 | Wechselberger et al. | 178/22.08 |
| 4,531,021 | A | 7/1985 | Bluestein et al. | 178/22.08 |
| 4,864,615 | A | 9/1989 | Bennett et al. | 380/21 |
| 4,866,770 | A | 9/1989 | Seth-Smith et al. | 380/20 |
| RE33,189 | E | 3/1990 | Lee et al. | 380/20 |
| 4,944,006 | A | 7/1990 | Citta et al. | 380/20 |
| 5,282,249 | A | 1/1994 | Cohen et al. | 380/23 |

(Continued)

FOREIGN PATENT DOCUMENTS

EP  0375539  6/1990

(Continued)

OTHER PUBLICATIONS

Jinyoung Moon; Jungtae Kim; Jongyoul Park; Euihyun Paik; Kwangroh Park; "A dynamic conditional access system based on cryptographic software for the IPTV set-top box", Consumer Electronics, ICCE '09. Digest of Technical Papers International Conference, Publication Year: 2009 , pp. 1-2.*

(Continued)

*Primary Examiner* — Michael Pyzocha
*Assistant Examiner* — Courtney D Fields
(74) *Attorney, Agent, or Firm* — Ladas & Parry LLP

(57) ABSTRACT

A method for generating a plurality of control words, each control word controlling access to an object. The method includes providing a control word packet (CWP), generating a first control word (CW) from the CWP, providing a second CW generation input and producing a second CW based, at least in part, on both of the following the first CW and the second CW generation input. Control word generating apparatus for generating a plurality of control words is also disclosed.

13 Claims, 23 Drawing Sheets

U.S. PATENT DOCUMENTS

| | | | | |
|---|---|---|---|---|
| 5,301,247 | A | | 4/1994 | Rasmussen et al. ............ 380/43 |
| 5,481,609 | A | | 1/1996 | Cohen et al. .................... 380/16 |
| 5,499,298 | A | | 3/1996 | Narasimhalu et al. .......... 380/25 |
| 6,091,818 | A | * | 7/2000 | Campinos et al. ............ 713/155 |
| 6,178,242 | B1 | | 1/2001 | Tsuria ........................... 380/201 |
| 7,386,869 | B1 | * | 6/2008 | Bastien et al. .................... 725/6 |
| 2003/0152364 | A1 | | 8/2003 | Wajs |

FOREIGN PATENT DOCUMENTS

| | | | |
|---|---|---|---|
| EP | 0461029 | | 12/1991 |
| EP | 0778706 | | 6/1997 |
| EP | 0984629 | | 3/2000 |
| GB | 2141897 | A * | 1/1985 |
| GB | 2326004 | | 12/1998 |
| GB | 2426674 | | 11/2006 |
| WO | 9945711 | | 9/1999 |

OTHER PUBLICATIONS

English translation of EP 0 375 539 dated Jun. 27, 1990.
English translation of EP 0 461 029 dated Dec. 11, 1991.
Guillou, L.C., et al. "Encipherment and Conditional Access" *SMPTE Journal*, vol. 103, No. 6, p. 398-406, (1994).
EBU Project Group B/CA, "Functional model of a conditional access sytem" *EBU Review Technical Review*, No. 266, p. 64-77, (1995).
MPEG-2 standard, ISO/IEC 13818-6, Information technology—Generic coding of moving pictures and associated audio information—Part 6, (1998).
MPEG-2 standard, ISO/IEC 13818-6, Information technology—Generic coding of moving pictures and associated audio information—Part 6, Amendment 1 (2000).
MPEG-2 standard, ISO/IEC 13818-6, Information technology—Generic coding of moving pictures and associated audio information—Part 6, Amendment 2 (2000).
MPEG-2 standard, ISO/IEC 13818-6, Information technology—Generic coding of moving pictures and associated audio information—Part 6, Amendment 3 (2001).
MPEG-2 standard, ISO/IEC 13818-6, Information technology—Generic coding of moving pictures and associated audio information—Part 6, Technical Corrigendum 1 (1999).
MPEG-2 standard, ISO/IEC 13818-6, Information technology—Generic coding of moving pictures and associated audio information—Part 6, Technical Corrigendum 2 (2002).
ETSI Technical Report ETR 289 "Digital Video Broadcasting (DVB); Support for use of scrambling and Conditional Access (CA) within digital broadcasting systems" (1996).
ETSI TS 101 197 V 1.2.1 Technical Specification "Digital Video Broadcasting (DVB); DVB SimulCrypt; Head-end architecture and synchronization" (2002).
EN 301 192 V 1.1.1 Technical Specification "Digital Video Broadcasting (DVB); DVB specification for data broadcasting" (1997).
Advanced Television Systems Committee, document A/54, "Guide to the Use of the ATSC Digital Standard" (1995).
European Standard EN 50221, "Common Interface Specification for Conditional Access and other Digital Video Broadcasting Decoder Applications" (1997).
MPEG-4 standard, ISO/IEC 14496-1, "Information technology—Coding of audio-visual objects- Part 1" (2001).
MPEG-4 standard, ISO/IEC 14496-1, "Information technology—Coding of audio-visual objects- Part 1" Amendment 1, (2001).
MPEG-4 standard, ISO/IEC 14496-2, "Information technology—Coding of audio-visual objects- Part 2" (2001).
MPEG-4 standard, ISO/IEC 14496-2, "Information technology—Coding of audio-visual objects- Part 2" Amendment 1, (2002).
MPEG-4 standard, ISO/IEC 14496-2, "Information technology—Coding of audio-visual objects- Part 2" Amendment 2, (2002).
MPEG-4 standard, ISO/IEC 14496-6, "Information technology—Coding of audio-visual objects- Part 6" (2000).
Tianpu Jiang, et al. "Secure communication between set-top box and smart card in DTV Broadcasting." IEEE Transactions on Consumer Electronics, (2004) vol. 50 Issue 3, pp. 882-886.

* cited by examiner

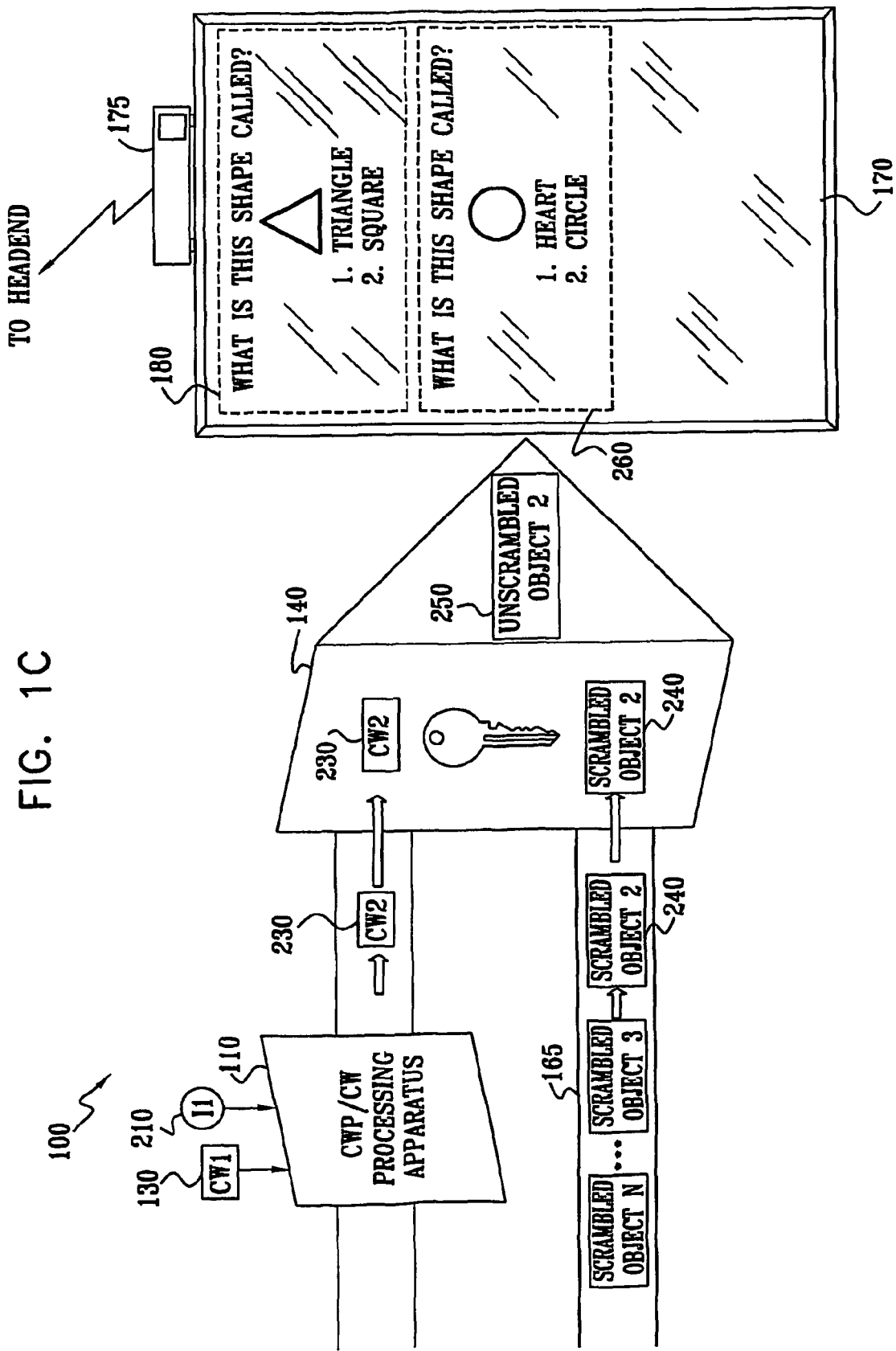

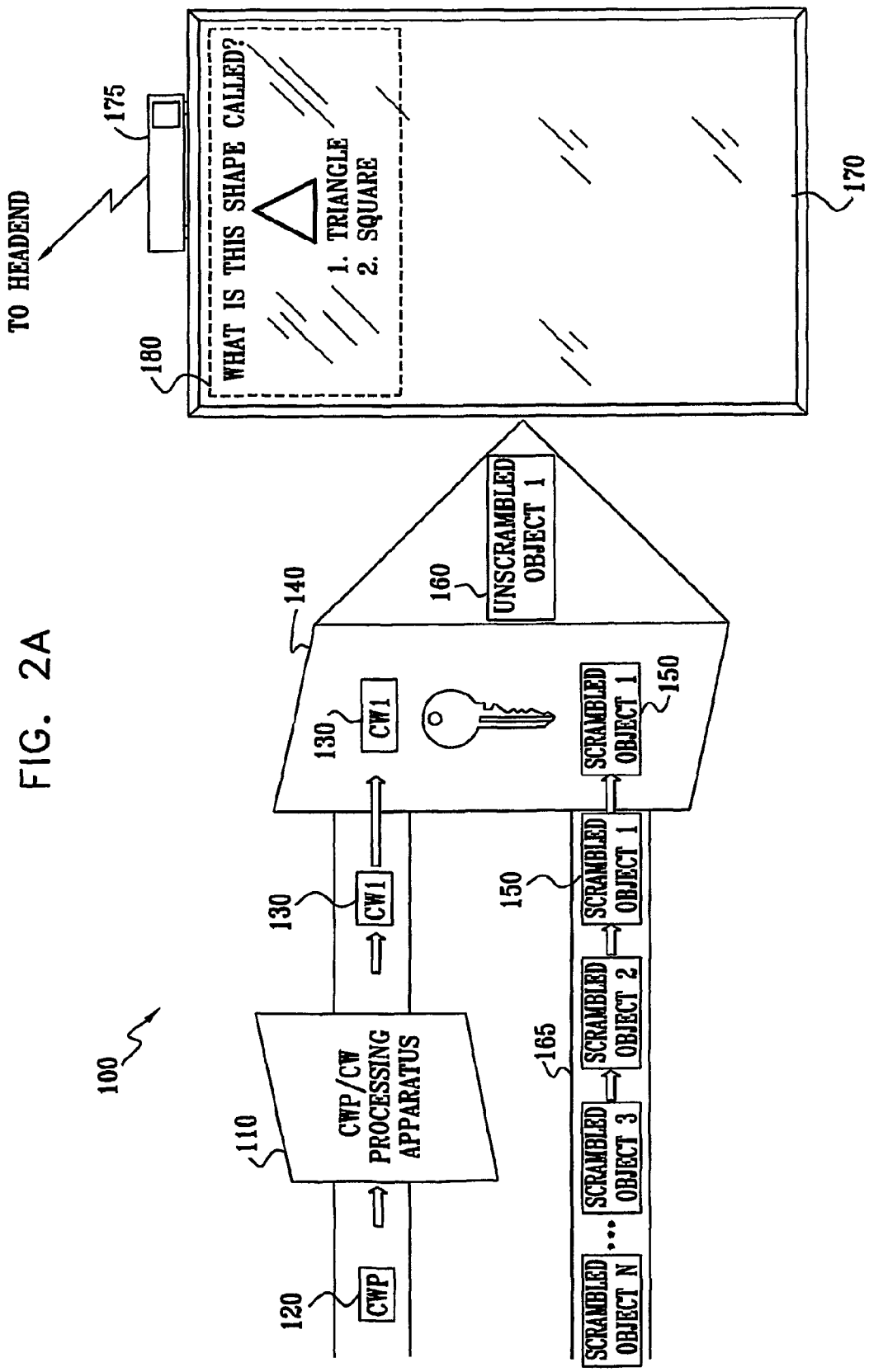

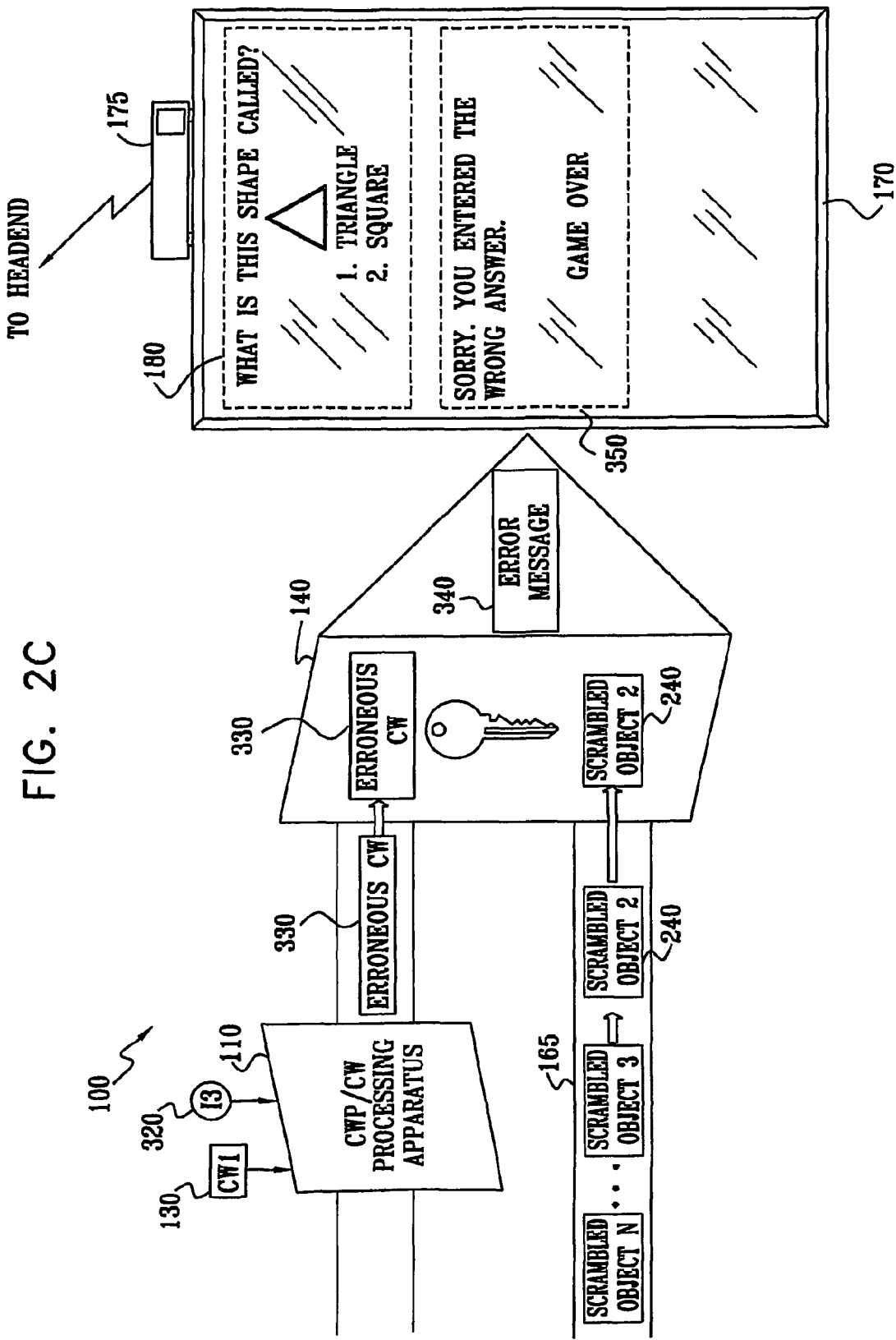

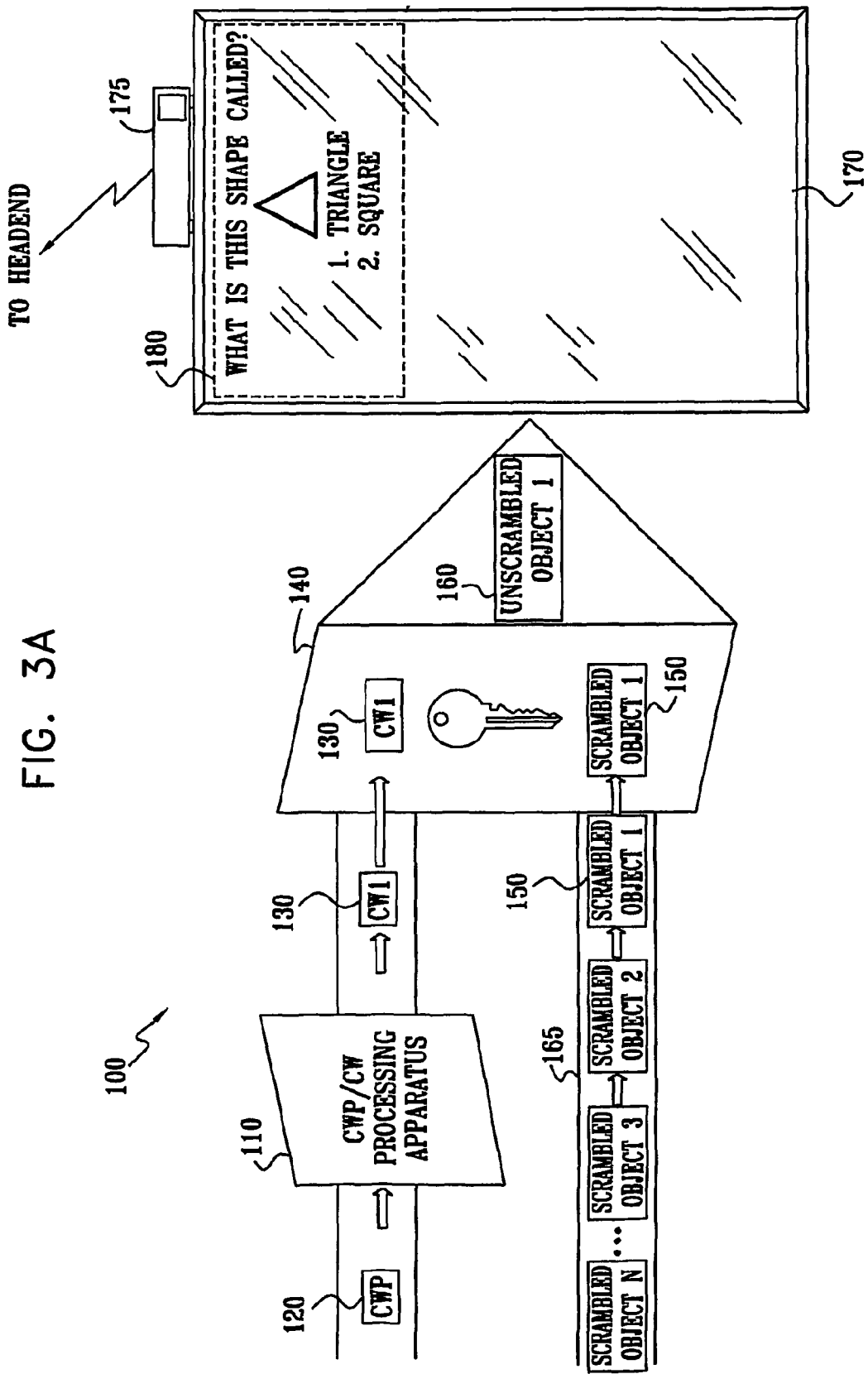

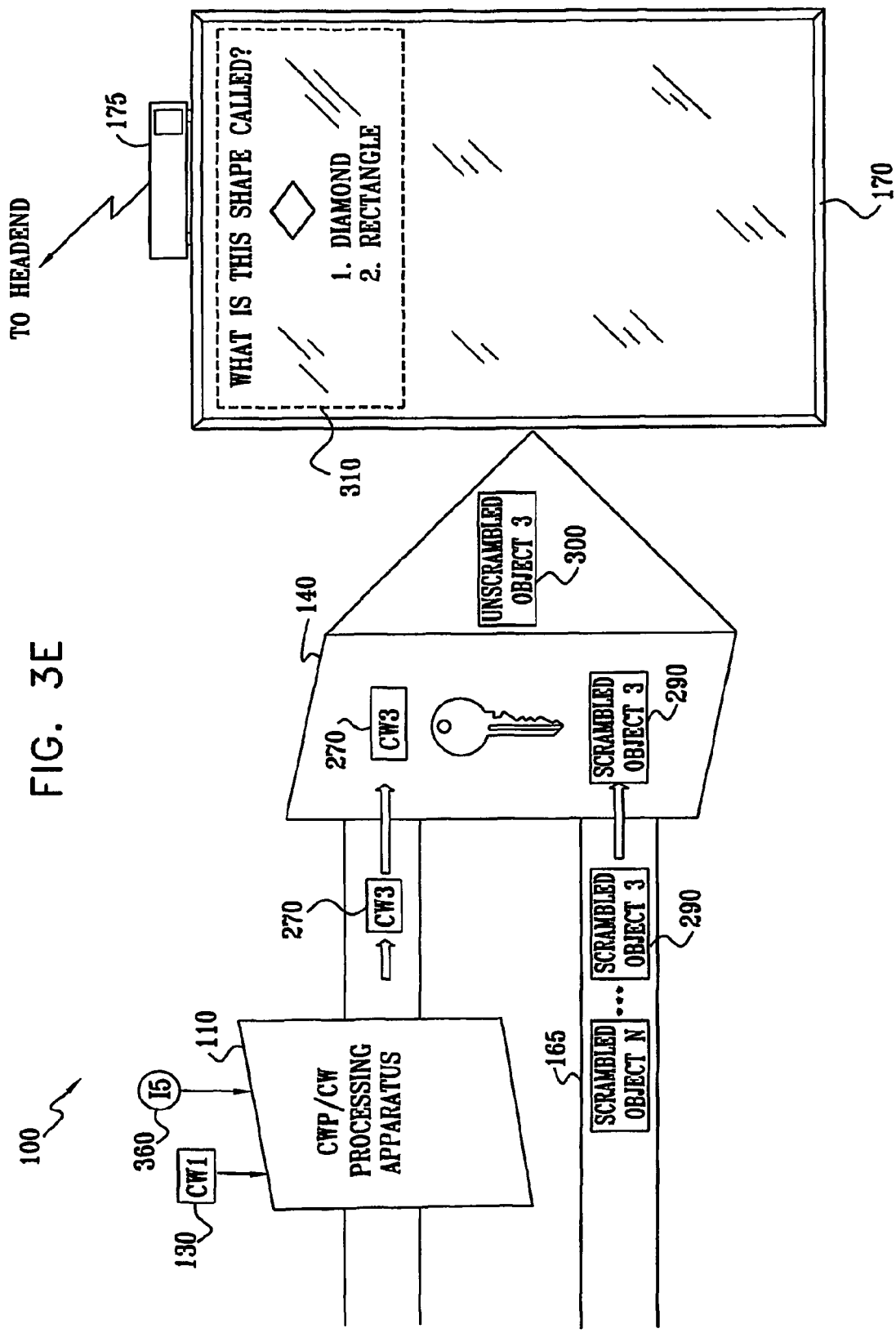

DYNAMICALLY SHIFTING CONTROL WORD

The present application is a divisional application of U.S. patent application Ser. No. 10/181,992, filed Oct. 15, 2002, Now U.S. Pat. No. 7,397,918 which is a 35 USC §371 application of PCT International Patent Application PCT/IL01/00434, filed on 16 May 2001 and entitled "DYNAMICALLY SHIFTING CONTROL WORD", which was published on 29 Nov. 2001 in the English language with International Publication Number WO 01/91466 A2, and which claims priority from U.S. Provisional Patent Application Ser. No. 60/206,056, filed 22 May 2000.

FIELD OF THE INVENTION

The present invention relates to conditional access in general, and in particular to conditional access systems for use in data broadcasting and related data applications.

BACKGROUND OF THE INVENTION

Systems for scrambling a television data stream are well-known in the art. One such system is described in the following U.S. Pat. No. 5,282,249 to Cohen et al.; U.S. Pat. No. 5,481,609 to Cohen et al. Scrambled television data streams described in the Cohen et al patents comprise both scrambled data representing television signals and coded control messages, also known as ECMs. The ECMs of Cohen et al comprise, in a coded form, data necessary for generating a control word (CW) which may be used to descramble the scrambled data representing television signals. An ECM is also termed a control word packet or CWP.

Data necessary for generating a control word is known in the prior art to take many different forms and may include, in general, at least any of the following: a control word; an encrypted control word packet which is intended to be decrypted before use; and a seed to a generating function such as, for example, a one-way function which generates the control word upon input of the seed. Throughout the present specification and claims the terms "control word generating information" and "CW generating information" are used interchangeably to designate data necessary for generating a control word in any appropriate form, as described above.

While the two patents to Cohen et al describe an analog system, that is, a system in which analog television data streams are broadcast to television sets, it is appreciated that similar ECM methods may also be used for digital television data streams. Generally, the scrambling techniques used for scrambling analog television signals such as, for example, the well-known "cut-and-rotate" technique, are chosen for their applicability to analog signals. In scrambling of digital television signals other scrambling techniques, well-known in the art, are used, the techniques being more appropriate to digital signals such as, for example, applying the well-known DES algorithm to the digital television signals.

Methods of transmitting a scrambled digital signal, including ECMs, are described in the MPEG-2 standard, ISO/IEC 13818-6, 12 Jul. 1996 and subsequent editions.

The system of Cohen et al and other systems described in the art share a feature of broadcasting an ECM synchronous to, generally immediately before or in a data stream parallel to, the actual scrambled broadcast. Typically, such an ECM is valid for a brief duration, with a new ECM being broadcast, in synchrony with a scrambled broadcast scrambled according to a new key, a few seconds, such as 10 seconds, after the broadcast of the previous ECM. Some systems have been described in which a key is sent, whether by broadcasting or by other means such as by mail, with a lower frequency, even as low as once a month. Such a system is described, for example, in U.S. Pat. No. 4,484,027 and Re 33,189 to Lee et al.

Patents describing systems related to encrypted broadcasting and/or key distribution in encrypted broadcasting systems include the following:

U.S. Pat. No. 4,228,321 to Flanagan describes a privacy transmission system with remote key control, in which key control signals are produced at the unscrambling location and are both used for unscrambling at that location and also transmitted to a scrambling location for use in scrambling.

U.S. Pat. No. 4,531,020 to Wechselberger et al describes a method for controlling the simultaneous broadcast of enciphered digital information signals, for example in a radio or television broadcast environment, to a plurality of subscribers using several levels of enciphering keys.

U.S. Pat. No. 4,531,021 to Bluestein et al describes enciphering digital information for transmission using a first key, common to all receivers, and a second key specific to one receiver of a small group of receivers.

U.S. Pat. No. 4,864,615 to Bennett et al describes a system for reproduction of secure keys by using distributed key generation data and a distributed encrypted prekey.

U.S. Pat. No. 4,866,770 to Seth-Smith et al describes a system for distributing video, audio, teletext, and data, in which system wide, individual decoder and group decoder control signals are transmitted as part of a composite signal. The group decoder control signal includes information relating to a group of decoders, while the individual decoder control signal includes information relating to the operation of individual decoders.

U.S. Pat. No. 4,944,006 to Citta et al describes a secure data packet transmission system utilizing a global encryption key as well as address keys for encrypting individually addressed bit packets.

U.S. Pat. No. 5,301,247 to Rasmussen et al describes a method for ensuring secure communications, in which two keys are combined together to produce a session key.

U.S. Pat. No. 5,499,298 to Narasimhalu et al describes a method for controlled dissemination of digital information, in which encrypted digital information is decrypted by a tamper-proof controlled information access device. Access to said tamper-proof controlled information access device is provided according to conditions specified by an information provider.

In general, methods of transmitting a scrambled digital signal, including ECMs, are well known. Some systems use a composite signal, that is, an analog or digital signal including a plurality of components. Typically the plurality of components includes both a scrambled television signal component and an ECM component, the ECM component comprising a plurality of ECMs. Prior art references which discuss examples of this type of signal include the following: DVB ETR289, "Digital Video Broadcasting (DVB): Support for use of scrambling and conditional access (CA) within digital broadcasting systems"; and DVB SIM061, "Technical specification of DVB-Simulcrypt", 1 Apr. 1997.

Other documents relating to broadcasting of digital information include the DVB Specification for Data Broadcasting, document SI-DAT 360 (TM 1779), 12 Feb. 1997; and ATSC Digital Television Standard, document A54, October 1995 and subsequent editions.

Other methods of transmitting a scrambled digital signal, particularly useful in a case where the signal includes sub-signals encoded according to various different methods, are described in "Common Interface Specification for Conditional Access and other Digital Video Broadcasting Decoder Applications", DVB document A017, May 1996 and subsequent editions; and in "Common Interface Specification for Conditional Access and other Digital Video Broadcasting Decoder Applications", CENELEC EN50221:1997.

European Patent Application EP 0 375 539 to Guillon et al describes a process which includes access messages when emitting composite video signals, unscrambling the resulting signals using a smart card reader, whereby the smart card comprises encoded digital data, and utilizing an interactive process for the identification of a digital signature.

European Patent Application EP 0 461 029 to Jouet et al describes a transcontroller device that is intended for an installation conforming to a MAC/PACKET standard.

PCT Patent Application WO 99/45711 to Sered et al describes a key delivery method for use in an encoded communications system in which at least one encoded item including a first item encoded with a first item control word is sent in a communication stream from a sender to a receiver. The method described includes transmitting an item entitlement control message (IECM) comprising item control information, transmitting a stream entitlement control message (SECM) comprising stream control information, and combining at least part of the item control information and at least part of the stream control information to produce the first item control word.

U.S. Pat. No. 6,178,242 to Tsuria describes a digital recording protection system using ECMs.

The disclosure of U.S. Provisional Patent Application 60/206,056, from which the present application claims priority, is hereby incorporated herein by reference.

GB Patent 2 326 004 to Bauminger et al describes a viewer response method for use with an interactive telecommunications system. The method includes accumulating a user interaction history of a user of the system. The user interaction history includes user interaction information associated with a plurality of user interaction events; and provides user-sensible feedback, based at least in part on the user interaction history.

The disclosures of all references mentioned above and throughout the present specification are hereby incorporated herein by reference.

MPEG-4, the most recent edition of the MPEG standard, enables the broadcaster to manipulate video objects independently of each other. The MPEG-4 standard does not address the issue of conditional access at the level of objects.

SUMMARY OF THE INVENTION

The present invention seeks to provide an improved conditional access system and particularly a conditional access system useful for controlling a plurality of objects.

The term "digital data stream," as used throughout the present specification and claims, refers in a broad sense to any stream of digital data transmitted continuously at least during a particular period of time, and particularly includes broadcast digital data such as broadcast digital television signals.

The term "scrambling" in all of its forms, as used throughout the present specification and claims, refers to any appropriate method of scrambling, encoding, or encrypting data, many such methods being well-known in the art.

The term "display" in all of its forms, as used throughout the present specification and claims, is not limited to visual presentation, but includes making palpable to the senses or producing any appropriate sensible representation.

Applying principles known in the prior art, it would be straightforward to deliver one ECM, to generate one CW, per object.

In a preferred embodiment, the present invention seeks to provide apparatus and methods for generating more than one CW from a single ECM.

Preferably, in the present invention, one or more appropriate transformations are provided for producing a first CW and subsequent CWs from a single ECM.

It is appreciated that each individual CW may control one object or may control a so-called "mega-object" which is comprised of a plurality of objects.

There is thus provided in accordance with a preferred embodiment of the present invention a method for generating a plurality of control words, each control word controlling access to an object, the method including providing a control word packet (CWP), generating a first control word (CW) from the CWP, providing a second CW generation input, and producing a second CW based, at least in part, on both of the following: the first CW and the second CW generation input.

Further in accordance with a preferred embodiment of the present invention each control word controls access to a plurality of objects.

Still further in accordance with a preferred embodiment of the present invention the method also includes utilizing the first CW to control access to a first object, and utilizing the second CW to control access to a second object.

Additionally in accordance with a preferred embodiment of the present invention the method also includes providing a third CW generation input, and producing a third CW based, at least in part, on both of the following: the second CW and the third CW generation input.

Moreover in accordance with a preferred embodiment of the present invention the third CW generation input includes a user input.

Further in accordance with a preferred embodiment of the present invention the third CW generation input includes a user characteristic input associated with a user.

Still further in accordance with a preferred embodiment of the present invention the user characteristic input includes at least one of the following: an indication of a geographic region associated with the user, an indication of urban/rural dwelling associated with the user, an indication of a preference associated with the user, an indication of an age category associated with the user, an indication of an age associated with the user, an indication of a gender associated with the user, and an indication of an ethnic identity associated with the user.

Additionally in accordance with a preferred embodiment of the present invention the method also includes receiving a data stream wherein the first object and the second object are included in the data stream.

Moreover in accordance with a preferred embodiment of the present invention the data stream includes a broadcast data stream.

Further in accordance with a preferred embodiment of the present invention the data stream includes an MPEG data stream.

Further in accordance with a preferred embodiment of the present invention the MPEG data stream includes an MPEG-4 data stream.

Still further in accordance with a preferred embodiment of the present invention the first object and the second object includes a display object.

Additionally in accordance with a preferred embodiment of the present invention the display object includes a visual display object.

Moreover in accordance with a preferred embodiment of the present invention each of the first object and the second object includes an accumulative display object.

Further in accordance with a preferred embodiment of the present invention each of the first object and the second object includes an exclusive display object.

There is also provided in accordance with another preferred embodiment of the present invention a method for generating a second control word from a first control word, the first control word controlling access to a first object and the second control word controlling access to a second object, the method including providing a first control word (CW), providing a second CW generation input, and producing a second CW based, at least in part, on both of the following: the first CW and the second CW generation input.

Further in accordance with a preferred embodiment of the present invention each control word controls access to a plurality of objects.

Still further in accordance with a preferred embodiment of the present invention the second CW generation input includes a user input.

Additionally in accordance with a preferred embodiment of the present invention the second CW generation input includes a user characteristic input associated with a user.

Moreover in accordance with a preferred embodiment of the present invention the user characteristic input includes at least one of the following: an indication of a geographic region associated with the user, an indication of urban/rural dwelling associated with the user, an indication of a preference associated with the user, an indication of an age category associated with the user, an indication of an age associated with the user, an indication of a gender associated with the user, and an indication of an ethnic identity associated with the user.

Further in accordance with a preferred embodiment of the present invention the first object and the second object are included in the data stream.

Still further in accordance with a preferred embodiment of the present invention the data stream includes a broadcast data stream.

Additionally in accordance with a preferred embodiment of the present invention the data stream includes an MPEG data stream.

Moreover in accordance with a preferred embodiment of the present invention the MPEG data stream includes an MPEG-4 data stream.

Further in accordance with a preferred embodiment of the present invention each of the first object and the second object includes a display object.

Still further in accordance with a preferred embodiment of the present invention the display object includes a visual display object.

Additionally in accordance with a preferred embodiment of the present invention each of the first object and the second object includes an accumulative display object.

Moreover in accordance with a preferred embodiment of the present invention each of the first object and the second object includes an exclusive display object.

There is also provided in accordance with another preferred embodiment of the present invention, a method for generating a plurality of control words, each control word controlling access to an object, the method including providing a control word packet (CWP), generating a first control word (CW) from the CWP, providing a second CW generation input, producing a second CW based, at least in part, on both of the following: the first CW and the second CW generation input, utilizing the first CW to control access to a first object, utilizing the second CW to control access to a second object, providing a third CW generation input, producing a third CW based, at least in part, on both of the following: the second CW and the third CW generation input, and utilizing the third CW to control access to a third object.

Further in accordance with a preferred embodiment of the present invention each control word controls access to a plurality of objects.

There is also provided in accordance with another preferred embodiment of the present invention, a method for generating a plurality of control words, each control word controlling access to an object, the method including providing a first control word (CW), providing a second CW generation input, producing a second CW based, at least in part, on both of the following: the first CW and the second CW generation input, utilizing the first CW to control access to a first object, utilizing the second CW to control access to a second object, providing a third CW generation input, producing a third CW based, at least in part, on both of the following: the second CW and the third CW generation input, and utilizing the third CW to control access to a third object.

Further in accordance with a preferred embodiment of the present invention each control word controls access to a plurality of objects.

Still further in accordance with a preferred embodiment of the present invention at least one of the second CW generation input and the third CW generation input includes a user input.

Additionally in accordance with a preferred embodiment of the present invention the method also includes displaying at least the second object and the third object.

Moreover in accordance with a preferred embodiment of the present invention the displaying includes displaying the first object.

Further in accordance with a preferred embodiment of the present invention the method also includes providing an event associated with the first object, the second object, and the third object, and determining a price for the event.

Still further in accordance with a preferred embodiment of the present invention the price is based, at least in part, on at least one of the second CW generation input and the third CW generation input.

There is also provided in accordance with another preferred embodiment of the present invention a method for generating a plurality of control words, each control word controlling access to an object, the plurality of control words including a first control word and at least one additional control word, the method including providing a first control word (CW), setting a variable V equal to the first CW, for each additional CW to be generated, performing the following steps: providing an additional CW generation input, producing an additional CW based, at least in part, on both of the following: V, and the additional CW generation input, and setting the variable V equal to the additional control word.

Further in accordance with a preferred embodiment of the present invention each control word controls access to a plurality of objects.

Still further in accordance with a preferred embodiment of the present invention the providing a first CW includes providing a control word packet (CWP), generating the first CW from the CWP.

There is also provided in accordance with another preferred embodiment of the present invention a method for generating a plurality of control words, each control word controlling access to an object, the plurality of control words including a first control word and at least one additional control word, the method including providing a first control word (CW), for each additional CW to be generated, performing the following: steps providing an additional CW generation input, and producing an additional CW based, at least in part, on both of the following: the first CW, and the additional CW generation input.

Further in accordance with a preferred embodiment of the present invention each control word controls access to a plurality of objects.

Still further in accordance with a preferred embodiment of the present invention the providing a first CW includes providing a control word packet (CWP), and generating a first control word (CW) from the CWP.

Additionally in accordance with a preferred embodiment of the present invention each object includes a scrambled object, and each CW includes a key for descrambling the scrambled object associated therewith.

Moreover in accordance with a preferred embodiment of the present invention each control word controls access to a plurality of objects.

There is also provided in accordance with another preferred embodiment of the present invention, a method for providing a multiple-question game in a data broadcast environment, the method including providing a first scrambled question, providing a first control word (CW) including descrambling information for descrambling the first question, receiving, from a user, a first answer to the first question, and producing a second CW based, at least in part, on both of the following: the first CW and the first answer, the second CW including descrambling information for descrambling a second question.

Further in accordance with a preferred embodiment of the present invention at least one of the first question and the second question includes a plurality of questions.

There is also provided in accordance with another preferred embodiment of the present invention, control word generating apparatus for generating a plurality of control words, each control word controlling access to an object, the control word generating apparatus including a control word generator for generating a first control word (CW) from a control word packet (CWP), and a control word processor for producing a second CW based, at least in part, on both of the following: the first CW and a second CW generation input.

Further in accordance with a preferred embodiment of the present invention the apparatus includes a security subsystem, which includes at least one of the following: the control word generator, and the control word processor.

Still further in accordance with a preferred embodiment of the present invention the security subsystem includes a removable security element, which includes at least one of the following: the control word generator, and the control word processor.

There is also provided in accordance with another preferred embodiment of the present invention, control word generating apparatus for generating a second control word from a first control word, the first control word controlling access to a first object and the second control word controlling access to a second object, the control word generating apparatus including a control word processor for producing a second CW based, at least in part, on both of the following: a first CW and a second CW generation input.

There is also provided in accordance with another preferred embodiment of the present invention, control word generating apparatus for generating a plurality of control words, each control word controlling access to an object, the control word generating apparatus including a control word generator for generating a first control word (CW) from a control word packet (CWP), a control word processor for producing a second CW based, at least in part, on both of the following: the first CW and a second CW generation input, and an object access controller for utilizing the first CW to control access to a first object and the second CW to control access to a second object, wherein the control word processor is operative to produce a third CW based, at least in part, on both of the following: the second CW and a third CW generation input, and the object access controller is operative to utilize the third CW to control access to a third object.

Further in accordance with a preferred embodiment of the present invention the apparatus includes a security subsystem, which includes at least one of the following: the control word generator, the control word processor, and the object access controller.

Still further in accordance with a preferred embodiment of the present invention the security subsystem includes a removable security element, which includes at least one of the following: the control word generator, the control word processor, and the object access controller.

There is also provided in accordance with another preferred embodiment of the present invention control word generating apparatus for generating a plurality of control words, each control word controlling access to an object, the control word generating apparatus including a control word processor for producing a second CW based, at least in part, on both of the following: a first CW and a second CW generation input, and an object access controller for utilizing the first CW to control access to a first object and the second CW to control access to a second object, wherein the control word processor is operative to produce a third CW based, at least in part, on both of the following: the second CW and a third CW generation input, and the object access controller is operative to utilize the third CW to control access to a third object.

Further in accordance with a preferred embodiment of the present invention the apparatus also includes a security subsystem, which includes at least one of the following: the control word processor, and the object access controller.

Still further in accordance with a preferred embodiment of the present invention the security subsystem includes a removable security element, which includes at least one of the following: the control word processor, and the object access controller.

There is also provided in accordance with another preferred embodiment of the present invention, control word generating apparatus for generating a plurality of control words, each control word controlling access to an object, the plurality of control words including a first control word and at least one additional control word, the control word generating apparatus including a control word processor receiving a first control word (CW) as input and operative to set a variable V equal to the first CW, for each additional CW to be generated receive an additional CW generation input, produce an additional CW based, at least in part, on both of the following: V, and the additional CW generation input, and set the variable V equal to the additional control word.

There is also provided in accordance with another preferred embodiment of the present invention, control word generating apparatus for generating a plurality of control words, each control word controlling access to an object, the plurality of control words including a first control word and at least one additional control word, the control word generating apparatus including a control word processor receiving the first control word (CW) and operative, for each additional CW to be generated, to receive an additional CW generation input, and produce an additional CW based, at least in part, on both of the following: the first CW, and the additional CW generation input.

Further in accordance with a preferred embodiment of the present invention the apparatus also includes a security subsystem, which includes the control word processor.

Still further in accordance with a preferred embodiment of the present invention the security subsystem includes a removable security element, which includes the control word processor.

There is also provided in accordance with another preferred embodiment of the present invention, game apparatus for providing a multiple-question game in a data broadcast environment, the apparatus including a scrambled question descrambler receiving a first scrambled question and a first control word (CW) including descrambling information for descrambling the first question and operative to descramble the first question, and a control word processor receiving, from a user, a first answer to the first question and operative to produce a second CW based, at least in part, on both of the following: the first CW and the first answer, the second CW including descrambling information for descrambling a second question.

Further in accordance with a preferred embodiment of the present invention the apparatus also includes a security subsystem, which includes at least one of the following: the scrambled question descrambler, and the control word processor.

Still further in accordance with a preferred embodiment of the present invention the security subsystem includes a removable security element, which includes at least one of the following: the scrambled question descrambler, and the control word processor.

Additionally in accordance with a preferred embodiment of the present invention the removable security element includes a smart card.

BRIEF DESCRIPTION OF THE DRAWINGS

The present invention will be understood and appreciated more fully from the following detailed description, taken in conjunction with the drawings in which:

FIG. 1C is a simplified partly pictorial, partly block diagram illustration of the system of FIG. 1A, useful in understanding the operation thereof;

FIG. 2A is a simplified partly pictorial, partly block diagram illustration of a control word generating system constructed and operative in accordance with an alternative preferred embodiment of the present invention;

FIG. 2C is a simplified partly pictorial, partly block diagram illustration of the system of FIG. 2A, useful in understanding the operation thereof;

FIG. 3A is a simplified partly pictorial, partly block diagram illustration of a control word generating system constructed and operative in accordance with another preferred embodiment of the present invention;

FIG. 3E is a simplified partly pictorial, partly block diagram illustration of the system of FIG. 3A, useful in understanding the operation thereof;

DETAILED DESCRIPTION OF A PREFERRED EMBODIMENT

Figure 1A:
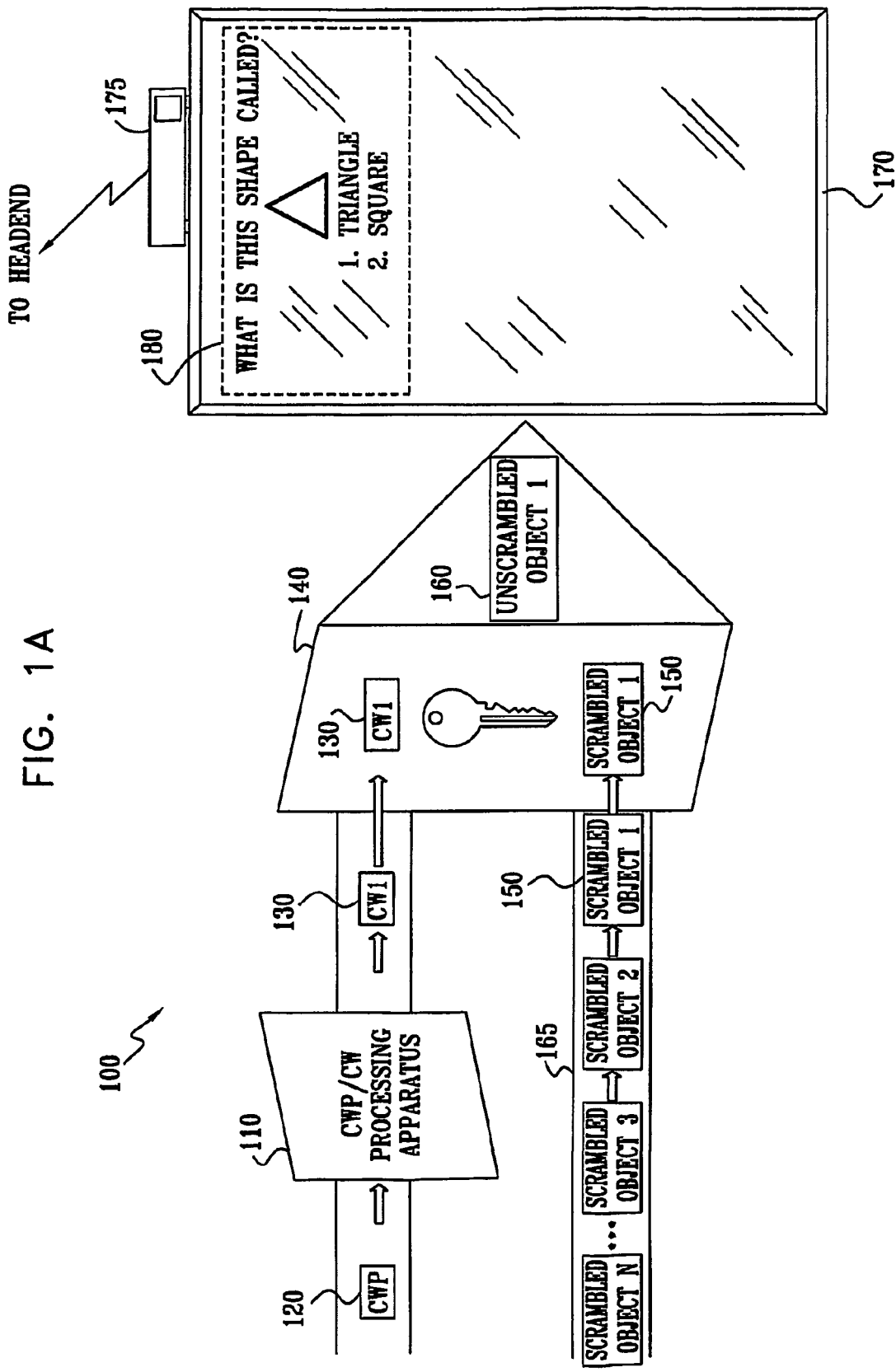
FIG. 1A is a simplified partly pictorial, partly block diagram illustration of a control word generating system constructed and operative in accordance with a preferred embodiment of the present invention.

In the drawings of the present application, similar reference numbers are used to refer to similar elements. For the sake of brevity and clarity of description, repeated description of similar elements is generally omitted.

Reference is now made to FIG. 1A which is a simplified partly pictorial, partly block diagram illustration of a control word generating system constructed and operative in accordance with a preferred embodiment of the present invention.

The system of FIG. 1A, generally designated 100, preferably comprises the following components, each of which may be implemented in a suitable combination of hardware and software, as is well known in the art:

1. Control word packet and control word (CWP/CW) processing apparatus 110, preferably operative to receive a CWP 120 and to produce therefrom, as described in detail below, a plurality of control words (CWs). A first control word (CW1) 130 is shown in FIG. 1A by way of example only.

2. Scrambled object unscrambling apparatus 140, preferably operative to receive a control word (CW), such as the CW1 130 and a scrambled object such as a first scrambled object (SO1) 150, and to produce therefrom a first unscrambled object (UO1) 160. Preferably, scrambled object unscrambling apparatus 140 uses appropriate mechanisms well known in the art to produce the UO1 160 from the SO1 150 and the CW1 130.

For example, and without limiting the generality of the foregoing, in a system using DES as a scrambling method, the SO1 150 preferably comprises an object scrambled using DES, the CW1 130 comprises a DES key for unscrambling the SO1 150, and the UO1 160 comprises the result of descrambling the SO1 150 using the DES descrambling method well known in the art and the DES key comprised in the CW1 130.

It is appreciated that many possible appropriate scrambling systems are known in the art, and that a person reasonably skilled in the art would be able to adapt the present invention for use with any appropriate scrambling system.

A datastream of scrambled objects 165 comprising a plurality of scrambled objects including SO1 150 is preferably input into scrambled object unscrambling apparatus 140

3. Unscrambled object display apparatus 170, which may comprise any appropriate apparatus for making the UO1 160 visible or otherwise sensible to one or more human senses. For purposes of simplicity of illustration and without limiting the generality of the foregoing, unscrambled object display apparatus 170 is shown in FIG. 1A as a television set which, as is well known in the art, typically comprises apparatus for making unscrambled input visible and audible. Unscrambled object display apparatus 170 will be referred to herein as television (TV) 170 or display 170, it being appreciated that any other appropriate type of unscrambled object display apparatus may alternatively or additionally be used.

4. The system of FIG. 1A also preferably comprises a set top box (STB) 175, which may comprise any appropriate set top box or integrated receiver/decoder (IRD), as is well known in the art, suitably programmed to provide a user interface as described herein. It is appreciated that: the STB 175 may or may not include a removable security element such as a smart card (not shown); and the functionality of the STB 175 may alternatively be included within the TV 170, in which case the STB 175 may be omitted.

As is well known in the art, the STB 175 is preferably operatively associated with the TV 170 and is preferably operative to receive and, where appropriate, decode television transmissions.

Preferably, as is also well known in the art, the STB 175 is equipped with a return path or other ability to communicate with a broadcaster, a broadcaster headend, or another appropriate location (not shown).

It is well known in the art that various types of return path are available, and that an appropriate return path should be chosen. For example, in the case of a cable broadcast, where the STB 175 is appropriate for receiving cable broadcasting, the return path may comprise a cable return path. In the case of a satellite broadcast, where the STB 175 is appropriate for receiving satellite broadcasting, the return path may comprise a telephone return path, also known as a "telephone link". It is appreciated that other technologies for implementing a return path, including but not limited to VSAT satellite return path technology, are known, and that any appropriate return path may be used.

Preferably, but not necessarily, CWP/CW processing apparatus 110 and scrambled object unscrambling apparatus 140 are comprised in the STB 175 or in a removable security element, such as a smart card, operatively associated therewith; those elements are shown separately in the drawings of the present application for purposes of simplicity and clarity of description.

One example of a system comprising a set top box with removable security element is described in U.S. Pat. No. 6,178,242 to Tsuria, the description of which is hereby incorporated herein by reference.

The operation of the system of FIG. 1A is now briefly described. The control word packet 120 is processed by CWP/CW processing apparatus 110 to generate the CW1 130.

Control words, such as the CW1 130, are input into scrambled object unscrambling apparatus 140 and are used to unscramble corresponding scrambled objects from the datastream of scrambled objects 165. Within the scrambled object unscrambling apparatus 140, the CW1 130 is used to unscramble the SO1 150 to produce the UO1 160 for display on the TV 170 as a display object 1 (DO1) 180.

It is appreciated that the UO1 160 is in the form of data, preferably digital data; the UO1 160 is shown in FIG. 1A displayed on the TV 170 as the DO1 180.

The source of the datastream of scrambled objects 165 including the SO1 150 could be a broadcast, a DVD disk, a VCR tape, a floppy disk, an attached hard drive, a magnetic tape, or any other appropriate source (none of which are shown) as is well known in the art.

Control words are generated, preferably by a smart card (not shown) which is associated with the STB 175. Logical values which are input via the user, the datastream 165, a user profile or any other means as is well known in the art may preferably be stored in a memory of the smart card.

Figure 1B:
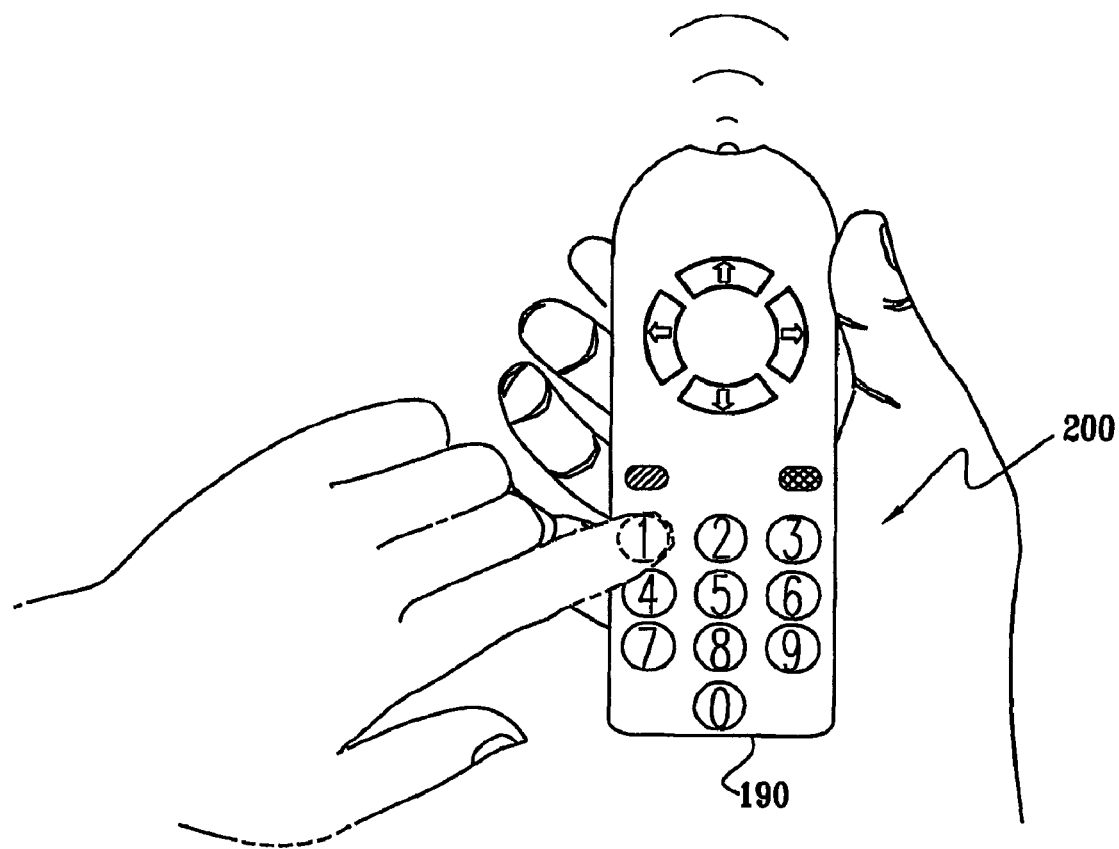
FIG. 1B is a simplified pictorial illustration of a control device, useful in understanding the operation of the system of FIG. 1A.

In the case where there is user input, the user presses on a control device, such as a control device 190 (FIG. 1B). The STB 175 registers that the user pressed a certain value and then the STB passes the certain value to the smart card. The smart card preferably stores the certain value that was passed to the smart card in the smart card's memory.

Smart card memory can be non-volatile, retaining data when not connected to an external power supply, or volatile, not retaining data when not connected to an external power supply. Non-volatile memory sources known in the art include EEPROM, EPROM, flash memory, ROM, and battery backed RAM. Volatile memory sources known in the art include RAM and data registers.

In the present invention, the smart card preferably takes the value entered by the user from the smart card's memory and uses that value as an input to generate the next control word.

Reference is now additionally made to FIG. 1B, which is a simplified pictorial illustration of a control device, useful in understanding the operation of the system of FIG. 1A.

A user preferably interacts with the system 100 in FIG. 1A. Thus, the user, via a control device 190, interacts with the STB 175 by responding to output displayed on the TV 170 via the control device 190. User interfaces of this general type are well known in the art.

It is appreciated that many types of appropriate user interface are well known, and that the depiction of the control device 190 in FIG. 1B is not meant to be limiting.

The control device 190 may comprise any appropriate control device suitable for use with the STB 175; for example, if the STB 175 is adapted to receive infrared control signals of a certain type, the remote control 190 is preferably adapted to produce signals of that type. The control device preferably includes a plurality of controls 200.

The user, in the example of FIG. 1A, sees the DO1 180 which includes a question. In FIG. 1B, the user uses the control device 190 by selecting at least one of the plurality of controls 200 to respond to the question which is displayed on the TV 170.

In FIG. 1B, by way of example, the user inputs the correct answer to the question posed in the D01 180 by entering "1" via the control device 190.

The example of FIGS. 1A and 1B is a user interaction interface; it is appreciated that the present invention is not limited to user interaction and can be based on other input including input supplied from a prestored user profile, which can be permanently associated with a particular user or which can be established at the beginning of each session.

For example, and without intending to limit the generality of the foregoing, a prestored user profile may include information regarding region, ethnicity, an urban/rural dwelling indicator, user preferences, age, age category, and gender.

For example and without intending to limit the generality of the foregoing, user information may be used to change the appearance of objects on the TV 170. A "vehicle" object can be either a car or a truck depending on an "urban/rural" region indicator. The "person" object driving the vehicle can be Jewish, Italian, Polish, Hispanic, Asian, African American etc. depending on the "ethnic" indicator. The "sky" object can be sunny or snowy depending on the "climate" indicator.

Reference is now additionally made to FIG. 1C which is a simplified partly pictorial, partly block diagram illustration of the system of FIG. 1A, useful in understanding the operation thereof.

FIG. 1C shows use of the user's correct response, input in FIG. 1B, to dynamically generate a second control word (CW2) 230 and reveal an additional object on the display.

In FIG. 1C, the CW1 130 and a first input (I1) 210 are processed by CWP/CW processing apparatus 110 to generate a second control word (CW2) 230. CWP/CW processing apparatus 110 preferably generates the CW2 230 through appropriate mathematical manipulation of its inputs, comprising the CW1 130 and the I1 210.

Any appropriate mathematical manipulation or operation can be applied to the inputs or to values derived from the inputs.

For example, and without limiting the generality of the foregoing: appropriate mathematical operations include XOR, OR, AND, NOT, NAND, NOR, and XNOR.

For example, and without limiting the generality of the foregoing: if the I1 210 is a one-byte value and the CW1 130 is an 8-byte value, the I1 210 can be applied via any appropriate mathematical operation to any byte of the CW1 130 to generate a value that can be used to derive the CW2 230 through further appropriate mathematical manipulation.

Alternatively an 8-byte value derived from the I1 210 can be generated by duplicating the value of the I1 in 8-bytes to create an 8-byte value derived from the I1 210. The 8-byte value derived from the I1 210 can then be used in a mathematical operation with the CW1 130 to generate the CW2 230.

Further alternatively the I1 210 and the CW1 130 can be used to initialize a one-way function to generate the CW2 230.

Still further alternatively the I1 210 and the CW1 130 can be used as inputs to a one-way function to generate the CW2 230.

Alternatively shifting the CW1 130 by a value derived from the I1 210 can be used to generate the CW2 230.

Individual bytes or individual bits of the CW1 130 can be shifted by a value derived from the I1 210 or by the value of the I1 210 itself. Shifting in which shifted bits wrap around and fill bits vacated by shifting may be used. Shifting in which empty spaces created by shifting are consistently filled with "0"s or consistently filled with "1"s may be used. Shifting may be done to the right or to the left of the value the CW1 130.

Further alternatively shifting the I1 210 by a value derived from the CW1 130 can be used to generate the CW2 230.

The mathematical operations discussed above are by way of example only and are not meant to be limiting.

CW1 130 and CW2 230 are used by way of example only in the above discussion. Control word generation for all subsequent control words may preferably be generated in a similar manner.

A method which iteratively offsets each successive control word by a value derived from the most recent user input can be used to generate the next control word in sequence. Such a method for generating successive control words is illustrated in FIGS. 1A-1F, as described herein.

An alternative method iteratively offsets a variable equal to CW1 by a value derived from the most recent user input to generate the next control word in sequence.

Within scrambled object unscrambling apparatus 140, the CW2 230 is used to unscramble a second scrambled object (SO2) 240 to produce a second unscrambled object (UO2) 250. It is appreciated that the UO2 250 is in the form of data and is displayed, preferably as a discrete object, on the TV 170 as a second display object (DO2) 260. DO1 180 and DO2 260 are preferably simultaneously displayed on the TV 170.

Figure 1D:
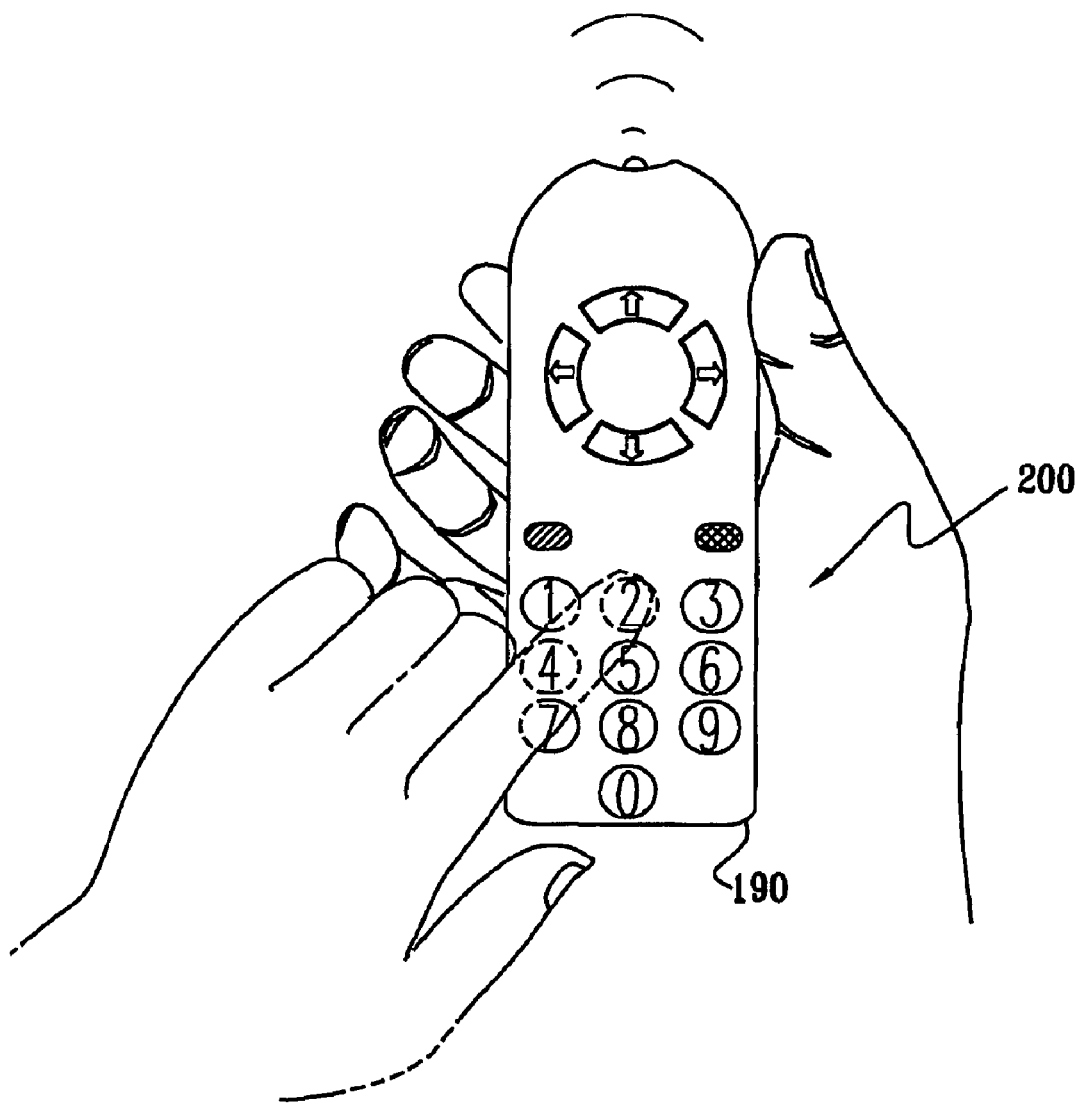
FIG. 1D is a simplified pictorial illustration of the control device of FIG. 1B, useful in understanding FIG. 1C.

Reference is now additionally made to FIG. 1D, which is a simplified pictorial illustration of the control device 190 of FIG. 1B, useful in understanding FIG. 1C.

In FIG. 1C, the DO2 260 includes a question which solicits user input. The user preferably interacts with the control device 190 in FIG. 1D by pressing at least one control from the plurality of controls 200 to enter a response to the question posed by the DO2 260.

In FIG. 1D, by way of example, the user inputs the correct answer to the question posed in the D02 260, by entering "2" via the control device 190.

Figure 1E:
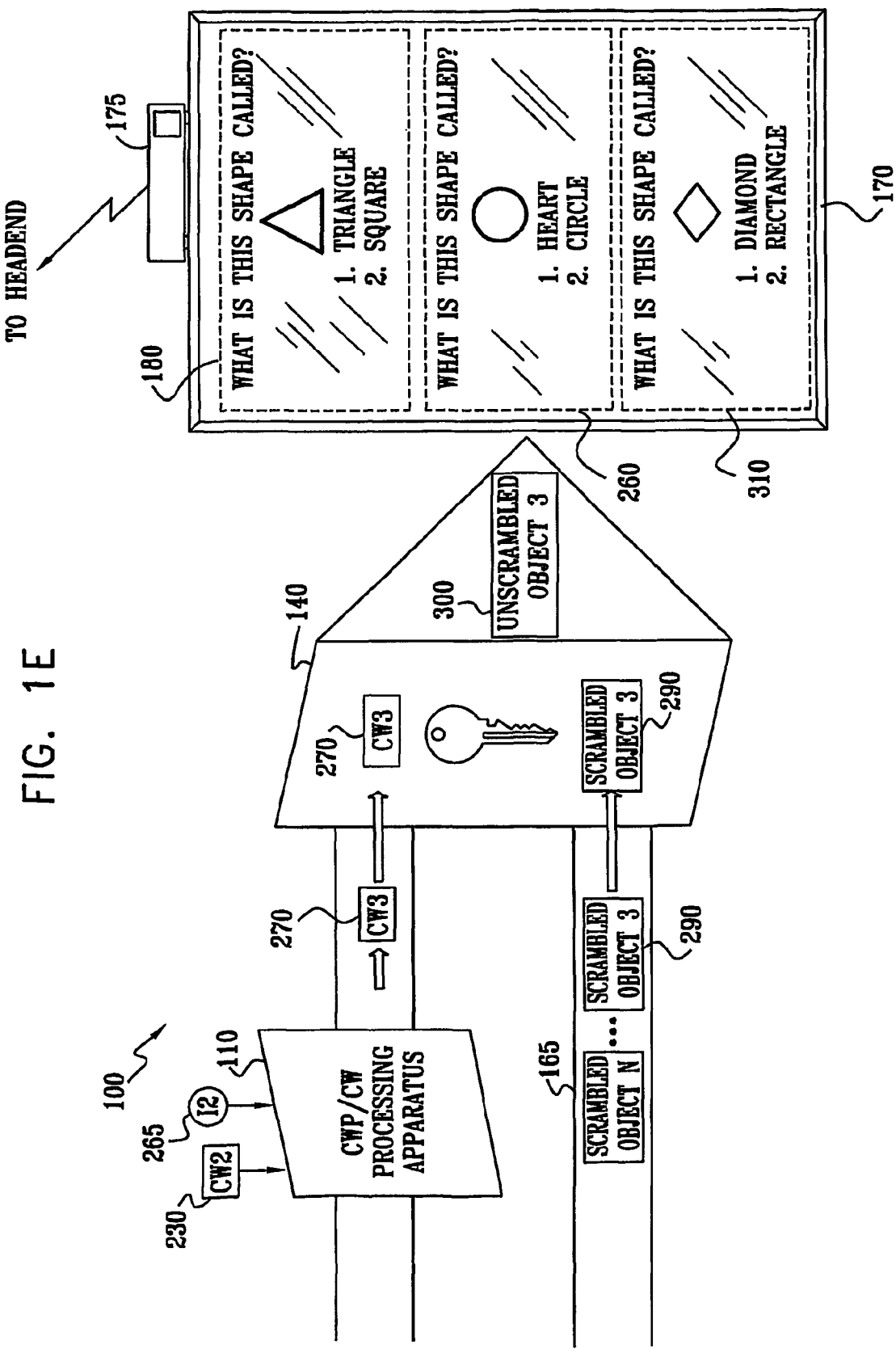
FIG. 1E is a simplified partly pictorial, partly block diagram illustration of the system of FIG. 1A, useful in understanding the operation thereof.

Reference is now additionally made to FIG. 1E which is a simplified partly pictorial, partly block diagram illustration of the system of FIG. 1A, useful in understanding the operation thereof.

FIG. 1E shows use of the user's correct response, input in FIG. 1D, to dynamically generate a third control word (CW3) 270 which reveals an additional object on the display 170.

In FIG. 1E, the CW2 230 and a second input (I2) 265 are processed by CWP/CW processing apparatus 110 to generate the third control word (CW3) 270. Within the scrambled object unscrambling apparatus 140, the CW3 270 is used to unscramble a third scrambled object (SO3) 290 to produce a third unscrambled object (UO3) 300. It is appreciated that the UO3 300 is in the form of data and is then displayed, preferably as a discrete object, on the TV 170 as a third display object (DO3) 310. The DO1 180, the DO2 260, and the DO3 310 are preferably simultaneously displayed on the TV 170.

Figure 1F:
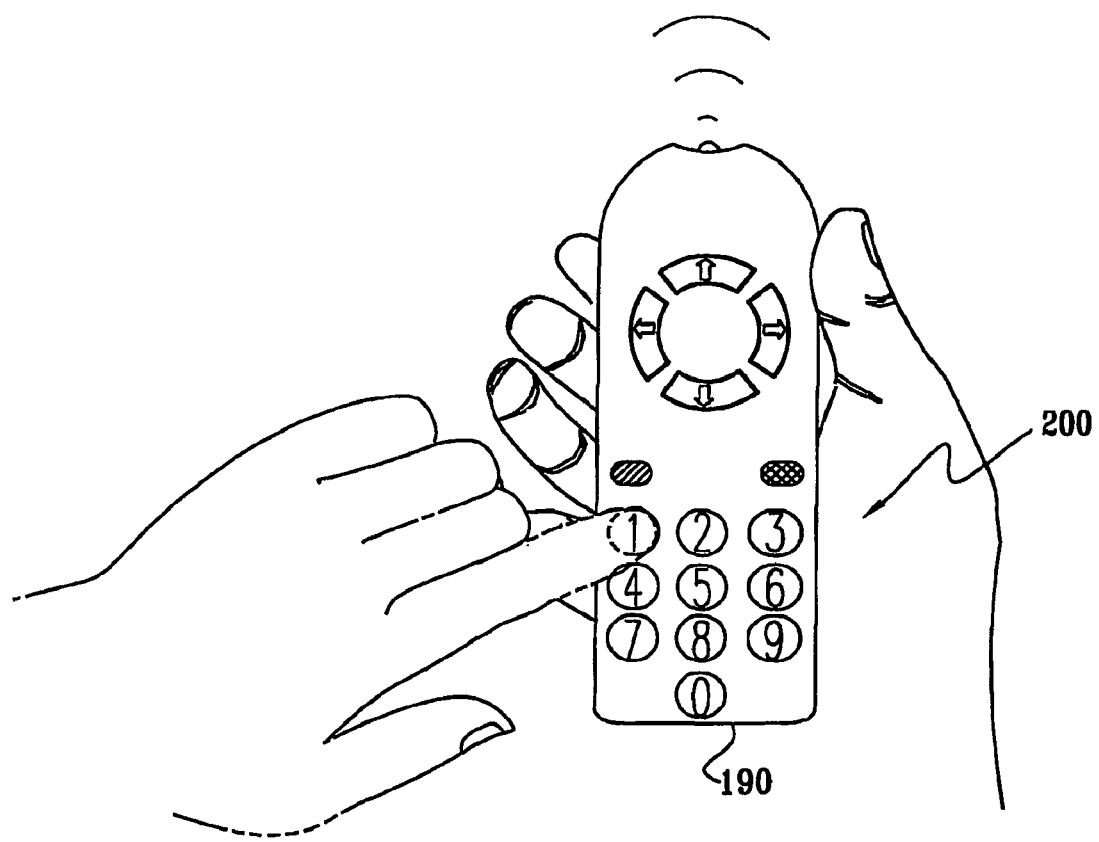
FIG. 1F is a simplified pictorial illustration of the control device of FIG. 1B, useful in understanding FIG. 1E.

Reference is now additionally made to FIG. 1F, which is a simplified pictorial illustration of the control device 190 of FIG. 1B, useful in understanding FIG. 1E.

In FIG. 1E, the DO3 310 includes a question which solicits user input. The user preferably interacts with the control device 190 in FIG. 1F by pressing at least one control from the plurality of controls 200 to enter a correct response to the question posed by the DO3 310.

In FIG. 1F, by way of example, the user inputs the correct answer to the question posed in the D03 310, by entering "1" via the control device 190.

The correct input can be used in combination with the CW3 270 to generate a fourth control word (not shown) in the same manner that the CW2 230 and the CW3 270 were generated. The process for generating control words from one CWP 120 as described in FIGS. 1A-1F is iterative and can continue until the application is completed, assuming that all of the responses that the user enters are correct. It is also appreciated, in accordance with the above description that iterative the CW 130 generation can occur a minimum of twice, once to generate the CW1 130 and once to generate the CW2 230.

Reference is now made to FIG. 2A which is a simplified partly pictorial, partly block diagram illustration of a control word generating system constructed and operative in accordance with an alternative preferred embodiment of the present invention.

The operation of the system of FIG. 2A is now briefly described. The control word packet 120 is processed by the CWP/CW processing apparatus 110 to generate the CW1 130. Within the scrambled object unscrambling apparatus 140, the CW1 130 is used to unscramble the SO1 150 to produce the UO1 160 for display on the TV 170 as the DO1 180.

It is appreciated that the UO1 160 is in the form of data, preferably digital data; the UO1 160 is shown in FIG. 2A displayed on the TV 170 as the DO1 180.

Figure 2B:
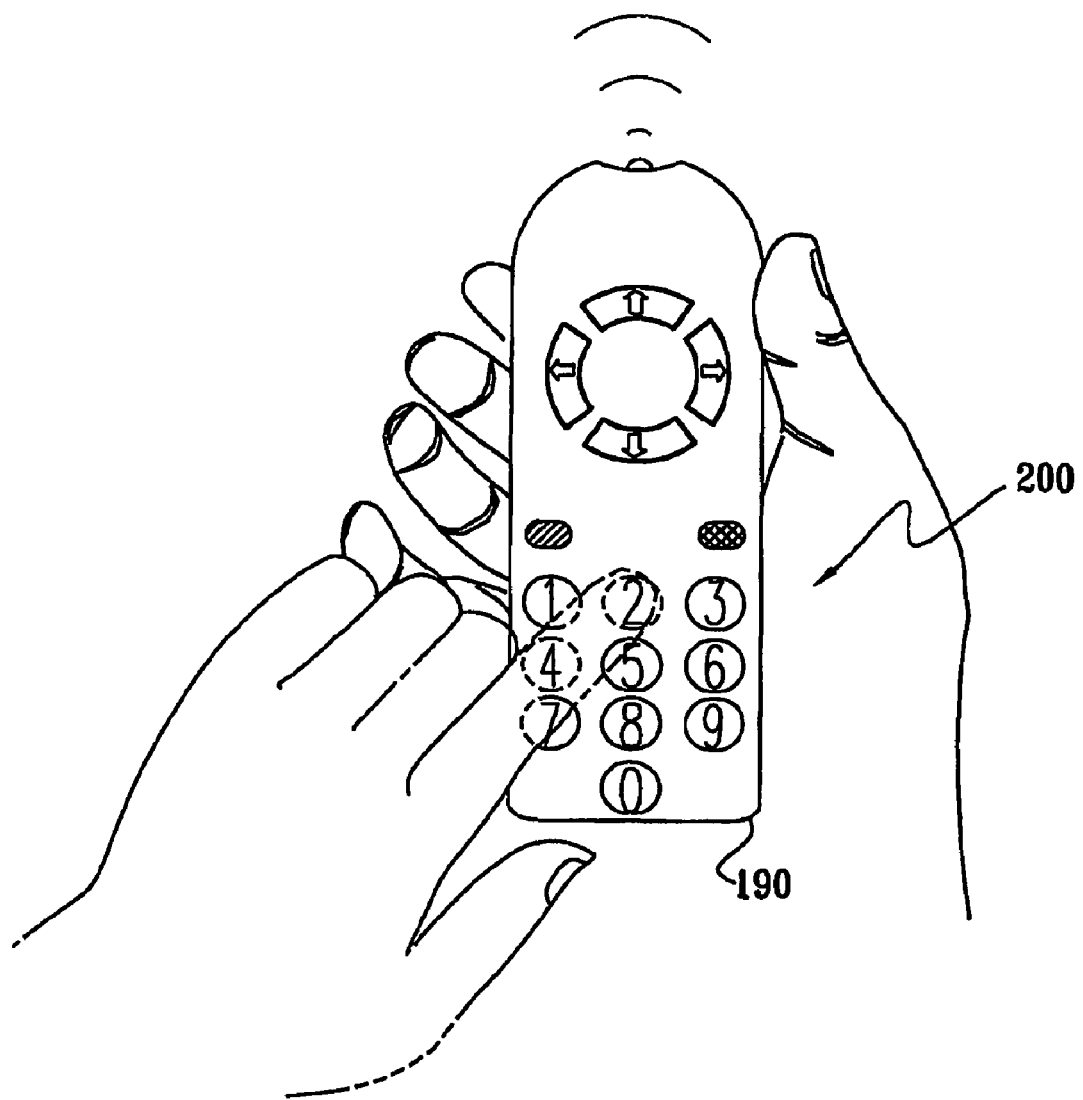
FIG. 2B is a simplified pictorial illustration of a control device, useful in understanding the operation of the system of FIG. 2A.

Reference is now additionally made to FIG. 2B, which is a simplified pictorial illustration of the control device 190 of FIG. 1B, useful in understanding the operation of the system of FIG. 2A. A user preferably interacts with the system 100 and thus with the TV 170 via the control device 190.

In FIG. 2A, the user sees the DO1 180 which includes a question.

In FIG. 2B, the user uses the control device 190 by selecting at least one of the plurality of controls 200 to incorrectly respond to the question which is displayed on the TV 170.

The example of FIGS. 2A and 2B is a user interaction interface; it is appreciated that the present invention is not limited to user interaction and can be based on other input including unsuitable or non-matching input supplied from a prestored user profile, as described above, which can be permanently associated with a particular user or which can be established at the beginning of each session.

Reference is now made to FIG. 2C which is a simplified partly pictorial, partly block diagram illustration of the system of FIG. 2A, useful in understanding the operation thereof.

FIG. 2C shows how the user's incorrect response, a third input (I3) 320, is used to generate an erroneous CW 330. The erroneous CW 330 is a CW which indicates to the system that unsuitable or non-matching input has been received. The erroneous CW 330 does not unscramble the next scrambled object in sequence. The erroneous CW 330 preferably causes an error message to be generated.

When the user enters a value, an explicit status is preferably returned to the software element that indicates whether the user entered a correct or incorrect response. For example, a method can be built into a smart card which indicates that the response input by the user is valid. Such methods are well known in the art and include digital signatures and checksums. When the explicit status registers an incorrect status, the erroneous CW 330 is generated.

Generating CW1 330 when the explicit status registers an incorrect status is by way of example only. When an incorrect status is registered in the explicit status, an error message can be generated in any other acceptable manner including the software breaking the generation of control words without an erroneous CW 330.

The erroneous CW 330 cannot be used to unscramble the SO2 240 and an error message 340 is generated instead. The error message 340 is displayed on the TV 170 as a display error 350. DO1 180 and the display error 350 are preferably simultaneously displayed on the TV 170.

The user is unable to proceed in the displayed interactive application because the previous control word is needed to generate the next control word in sequence.

It is further appreciated that, in embodiments where inputs are not interactively provided by a user, an incorrect input may halt subsequent control word generation, or may not halt subsequent word generation. An incorrect input and resultant generation of the erroneous CW 330 is preferably noted and acted upon in the conditional access system in some manner such as sending an error message back to the broadcaster or printing out an error message on the TV 170.

Reference is now made to FIG. 3A, which is a simplified partly pictorial partly block diagram illustration of a control word generating system constructed and operative in accordance with another preferred embodiment of the present invention.

The operation of the system of FIG. 3A is now briefly described. The control word packet 120 is processed by CWP/CW processing apparatus 110 to generate the CW1 130. Within the scrambled object unscrambling apparatus 140, the CW1 130 is used to unscramble the SO1 150 to produce the UO1 160 for display on the TV 170 as the DO1 180.

It is appreciated that the UO1 160 is in the form of data, preferably digital data; the UO1 160 is shown in FIG. 3A displayed on the TV 170 as the DO1 180.

By way of example, the DO1 180 is shown as occupying part of the screen. The DO1 180 could also occupy the entire screen. By way of example, DO1 180 is illustrated as a stationary display object. The DO1 180 could also be a dynamic video object which moves across the screen. The DO1 180 could also have associated audio or subtitle information.

Figure 3B:
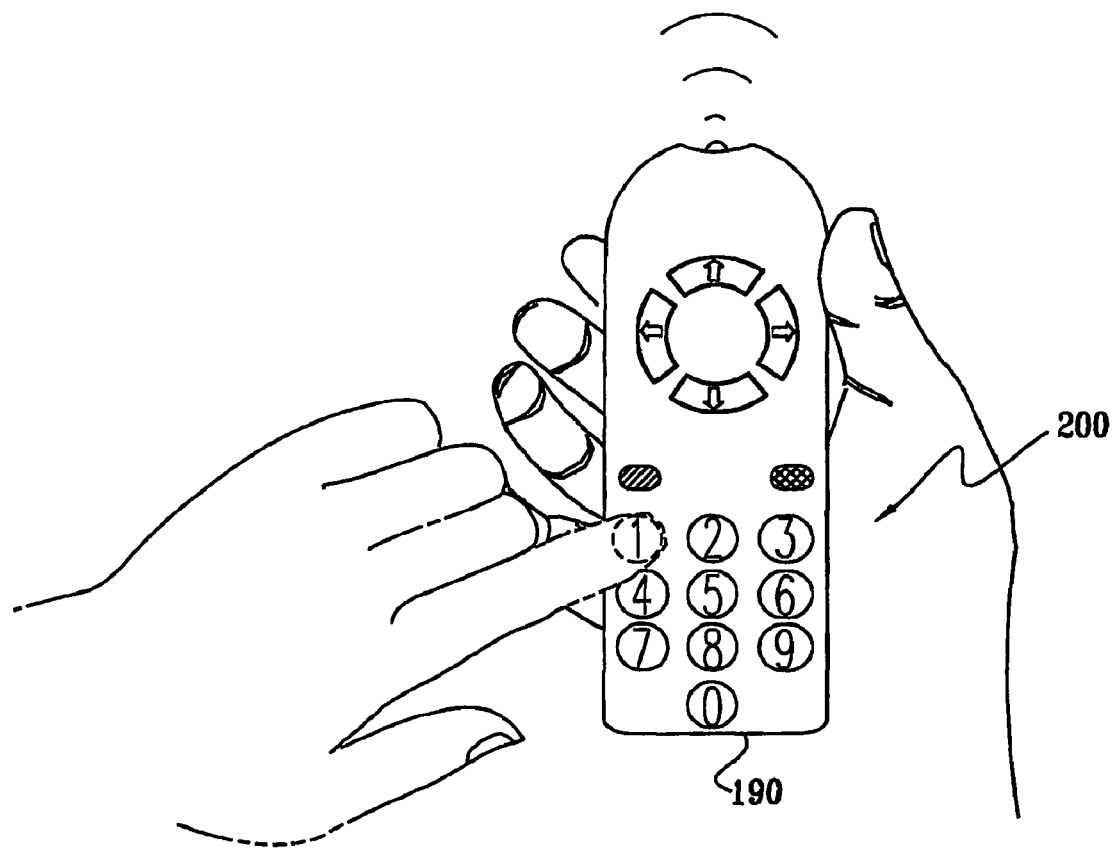
FIG. 3B is a simplified pictorial illustration of a control device, useful in understanding the operation of the system of FIG. 3A.

Reference is now additionally made to FIG. 3B, which is a simplified pictorial illustration of a control device, useful in understanding the operation of the system of FIG. 3A. A user preferably interacts with the system 100 and thus with the TV 170 via the control device 190.

In FIG. 3A, the user sees the DO1 180 which includes a question. In FIG. 3B, the user uses the control device 190 by selecting at least one of the plurality of controls 200 to respond to the question which is displayed on the TV 170.

The example of FIGS. 3A and 3B is a user interaction interface; it is appreciated that the present invention is not limited to user interaction and can be based on other input including input supplied from a prestored user profile, as described above, which can be permanently associated with a particular user or which can be established at the beginning of each session.

The operation of the embodiment of the invention, as described by FIGS. 3A-3F, outputs display objects on the TV 170 one at a time. Each display object is exclusively displayed on the TV 170, as opposed to being displayed accumulatively, where all display objects are simultaneously displayed.

The operation of the system of FIG. 3A is now briefly described.

In FIG. 3A, the DO1 180 is exclusively displayed on the TV 170.

In FIG. 3B, the user inputs the correct answer to the question posed in the D01 180 by entering "1" via the control device 190.

Figure 3C:
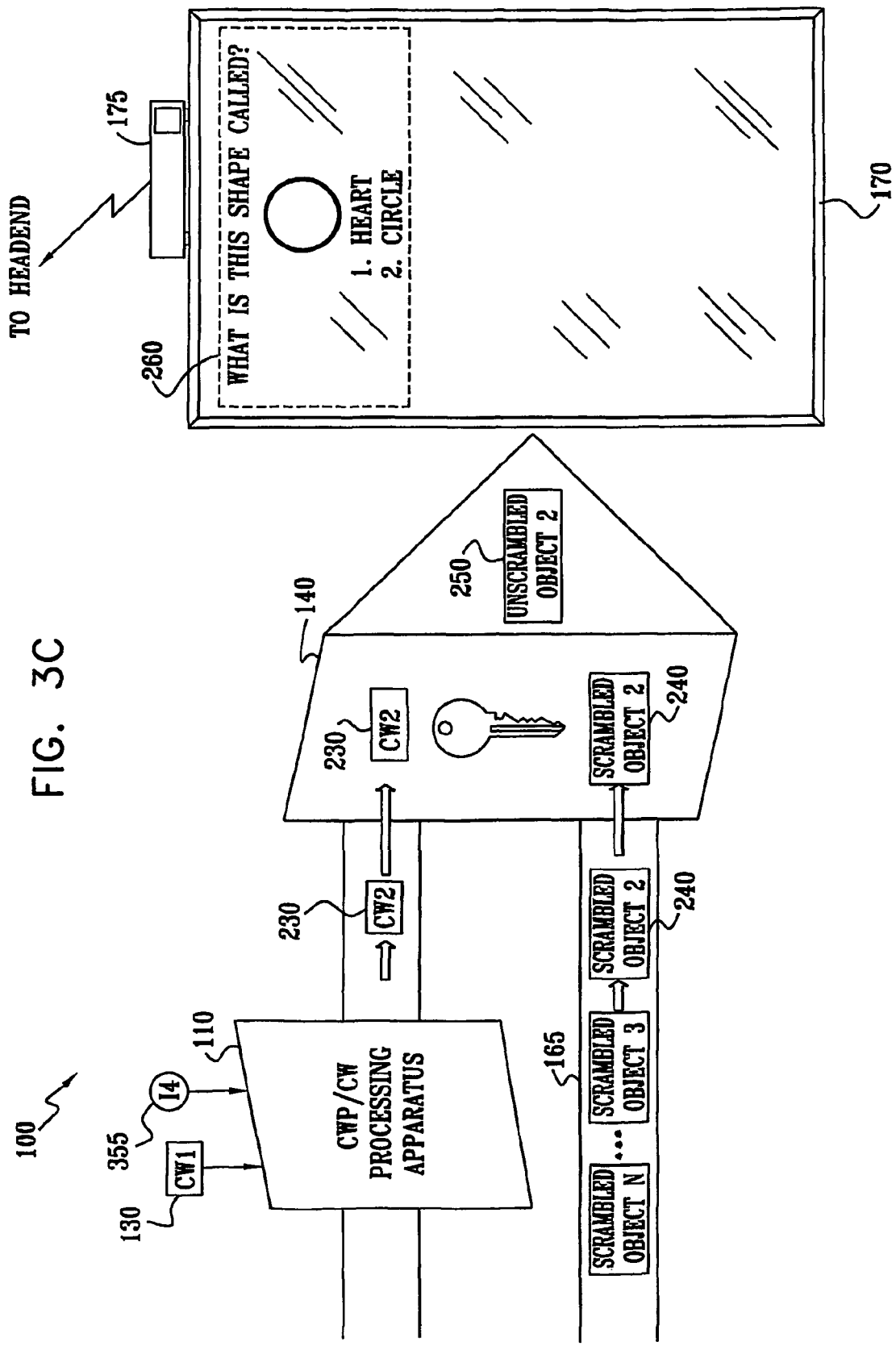
FIG. 3C is a simplified partly pictorial, partly block diagram illustration of the system of FIG. 3A, useful in understanding the operation thereof.

Reference is now made to FIG. 3C which is a simplified partly pictorial, partly block diagram illustration of the system of FIG. 3A, useful in understanding the operation thereof.

FIG. 3C shows use of the user's correct response, input in FIG. 3B, to dynamically generate the CW2 230, produce the UO2 250, and display the DO2 260 instead of the DO1 180 on the TV 170. The DO2 260 is exclusively displayed.

In FIG. 3C, the CW1 130 and a fourth input (I4) 355 are processed by a CWP/CW processing apparatus 110 to generate the second control word (CW2) 230. CWP/CW processing apparatus 110 preferably generates CW2 230 through mathematical manipulation of its inputs, the CW1 130 and the I4 355.

Possible means of accomplishing said manipulation is described above with reference to FIG. 1C.

Figure 3D:
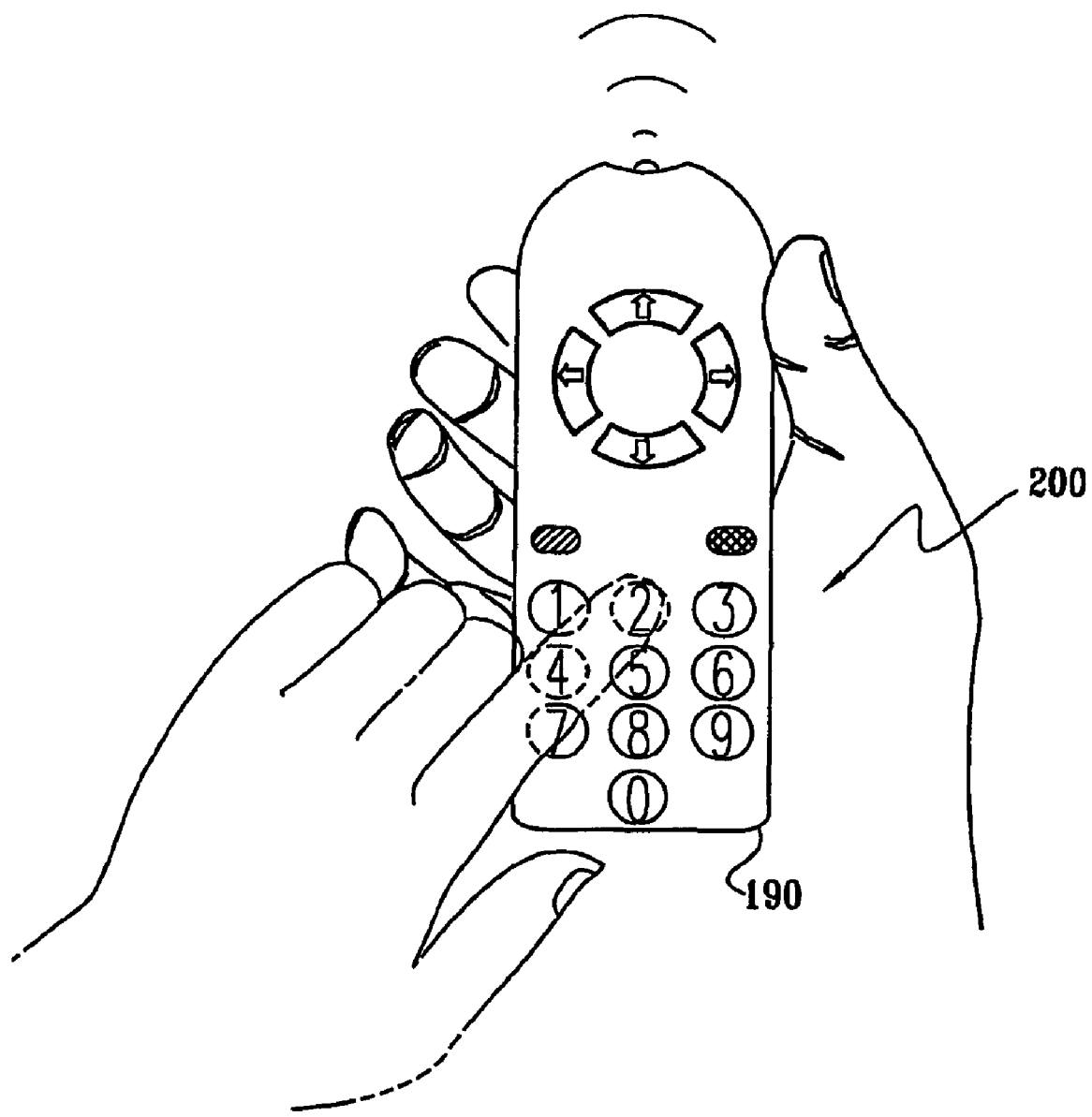
FIG. 3D is a simplified pictorial illustration of the control device of FIG. 3B, useful in understanding FIG. 3C.

Reference is now additionally made to FIG. 3D, which is a simplified pictorial illustration of the control device 190 of FIG. 3B, useful in understanding FIG. 3C. A user preferably interacts with the system 100 and thus with the TV 170 via the control device 190.

In FIG. 3D, by way of example, the user inputs the correct answer to the question posed in the D02 260, by entering "2" via the control device 190.

Reference is now additionally made to FIG. 3E which is a simplified partly pictorial, partly block diagram illustration of the system of FIG. 3A, useful in understanding the operation thereof.

FIG. 3E shows use of the user's correct response, input in FIG. 3D, to dynamically generate the CW3 270, produce the UO3 300, and display the DO3 310 instead of the DO2 260 on the TV 170. The DO3 310 is exclusively displayed.

In FIG. 3E, the CW1 130 and a fifth input (I5) 360 are processed by CWP/CW processing apparatus 110 to generate the CW3 270. Within scrambled object unscrambling apparatus 140, the CW3 270 is used to unscramble the SO3 290 to produce the UO3 300. It is appreciated that the UO3 300 is in the form of data and is then displayed, preferably as a discrete object, on the TV 170 as the DO3 310.

Figure 3F:
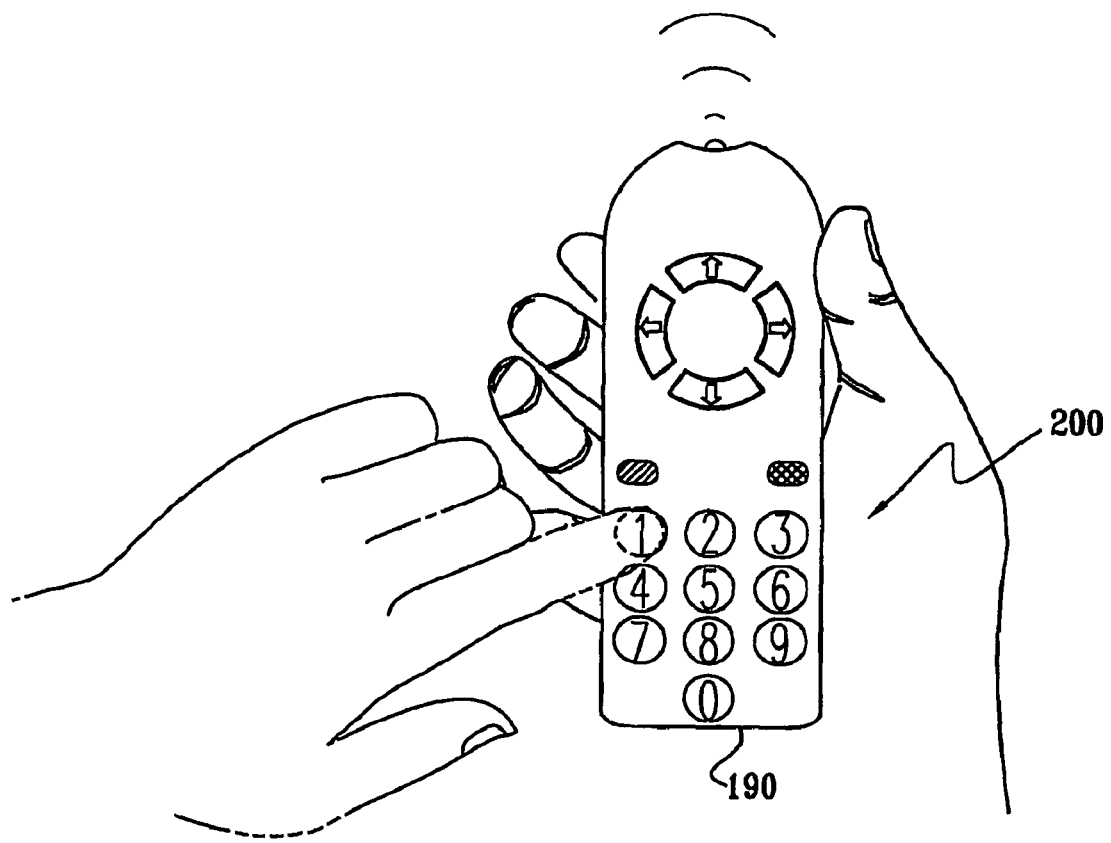
FIG. 3F is a simplified pictorial illustration of the control device of FIG. 3B, useful in understanding FIG. 3E.

Reference is now additionally made to FIG. 3F, which is a simplified pictorial illustration of the control device 190 of FIG. 3B, useful in understanding FIG. 3E.

In FIG. 3E, the DO3 310 includes a question which solicits user input. The user preferably interacts with the control device 190 in FIG. 3F by pressing at least one control from the plurality of controls 200 to enter a correct response to the question posed by the DO3 310.

In FIG. 3F, by way of example, the user inputs the correct response to the question posed in the D03 310, by entering "1" via the control device 190.

This correct input can be used in combination with CW1 to generate a fourth control word (not shown) in the same manner that CW2 and CW3 were generated. The process for generating control words from one CWP 120 as shown in FIGS. 3A-3F is iterative and can continue until the application is completed, assuming that all of the responses that the user enters are correct. It is also appreciated, in accordance with the above description that iterative CW generation can occur a minimum of twice.

The system of FIGS. 3A-3F preferably operates on the same principles as that of FIGS. 1A-1F with two exceptions:

1. In FIGS. 3A-3F, each display object is exclusively displayed on the TV 170. Each successive display object is displayed on the TV 170 instead of the display object which had previously been displayed. In FIGS. 1A-1F all display objects are accumulatively displayed.

2. In FIGS. 3A-3F, successive control word generation utilizes the CW1 130 as one of the inputs thereto. In FIGS. 1A-1F successive control word generation utilizes the latest generated control word as one of its inputs; for example, the CW2 230 is used as one of the inputs to generate CW3 270.

It is appreciated that the exclusive display of objects on the TV 170 and successive control word generation from a constant input, the CW1 130, are shown together by way of example only and can be implemented separately.

Figure 4A:
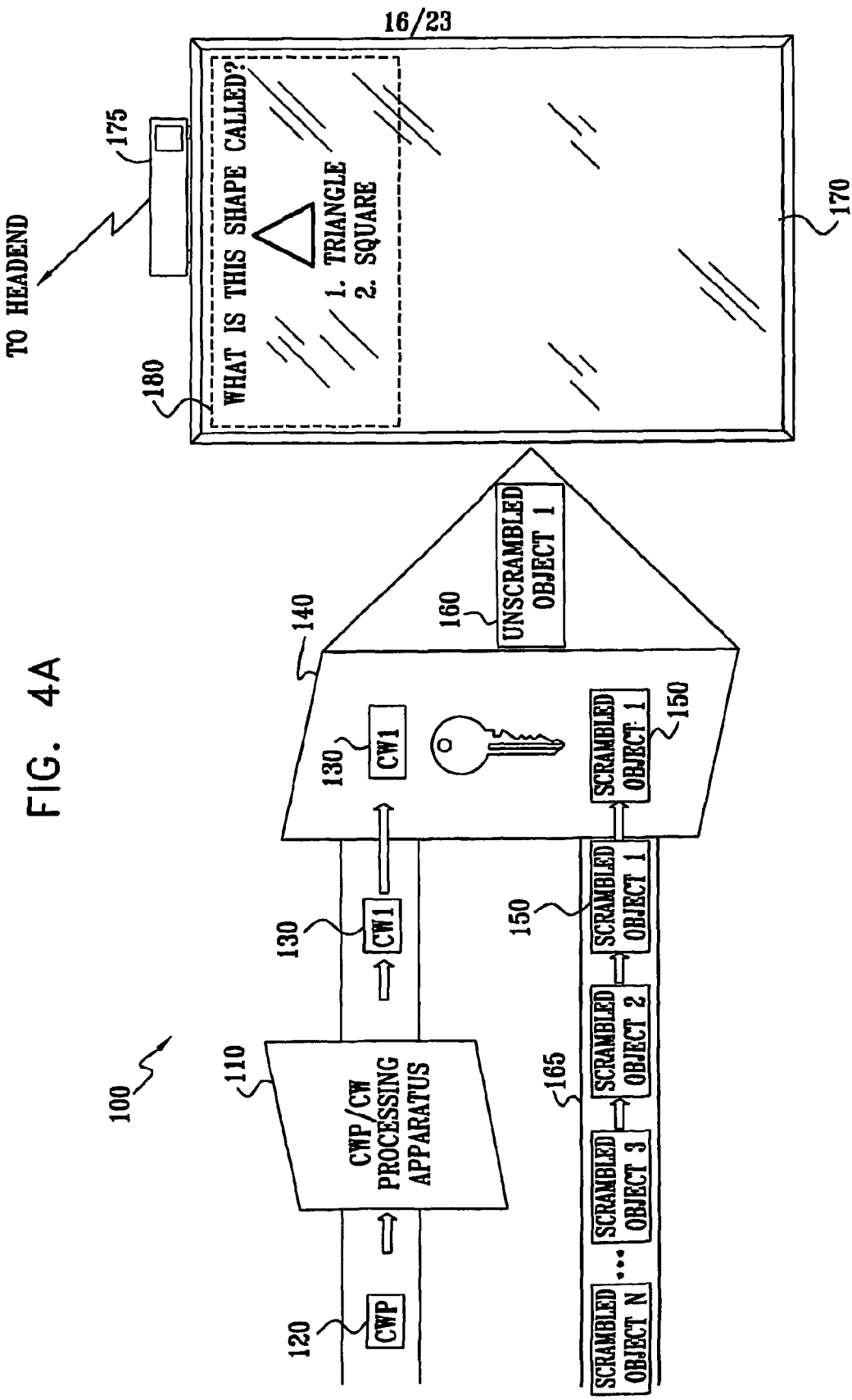
FIG. 4A is a simplified partly pictorial, partly block diagram illustration of a control word generating system constructed and operative in accordance with a further preferred embodiment of the present invention.

Reference is now made to FIG. 4A which is a simplified partly pictorial, partly block diagram illustration of a control word generating system constructed and operative in accordance with an alternative preferred embodiment of the present invention.

Figure 4B:
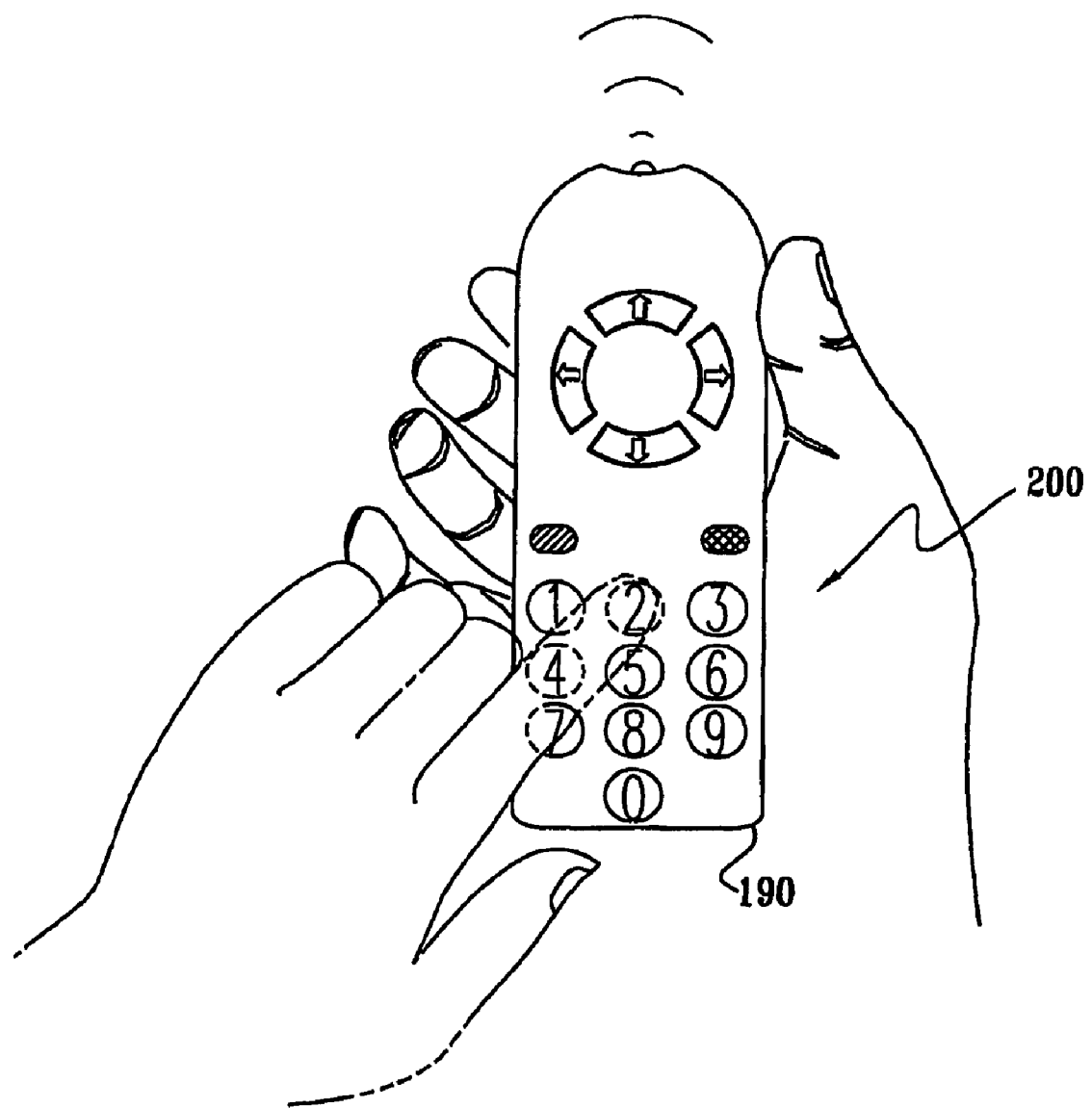
FIG. 4B is a simplified pictorial illustration of a control device, useful in understanding the operation of the system of FIG. 4A.

Reference is now additionally made to FIG. 4B which is a simplified pictorial illustration of a control device, useful in understanding the operation of the system of FIG. 4A.

Figure 4C:
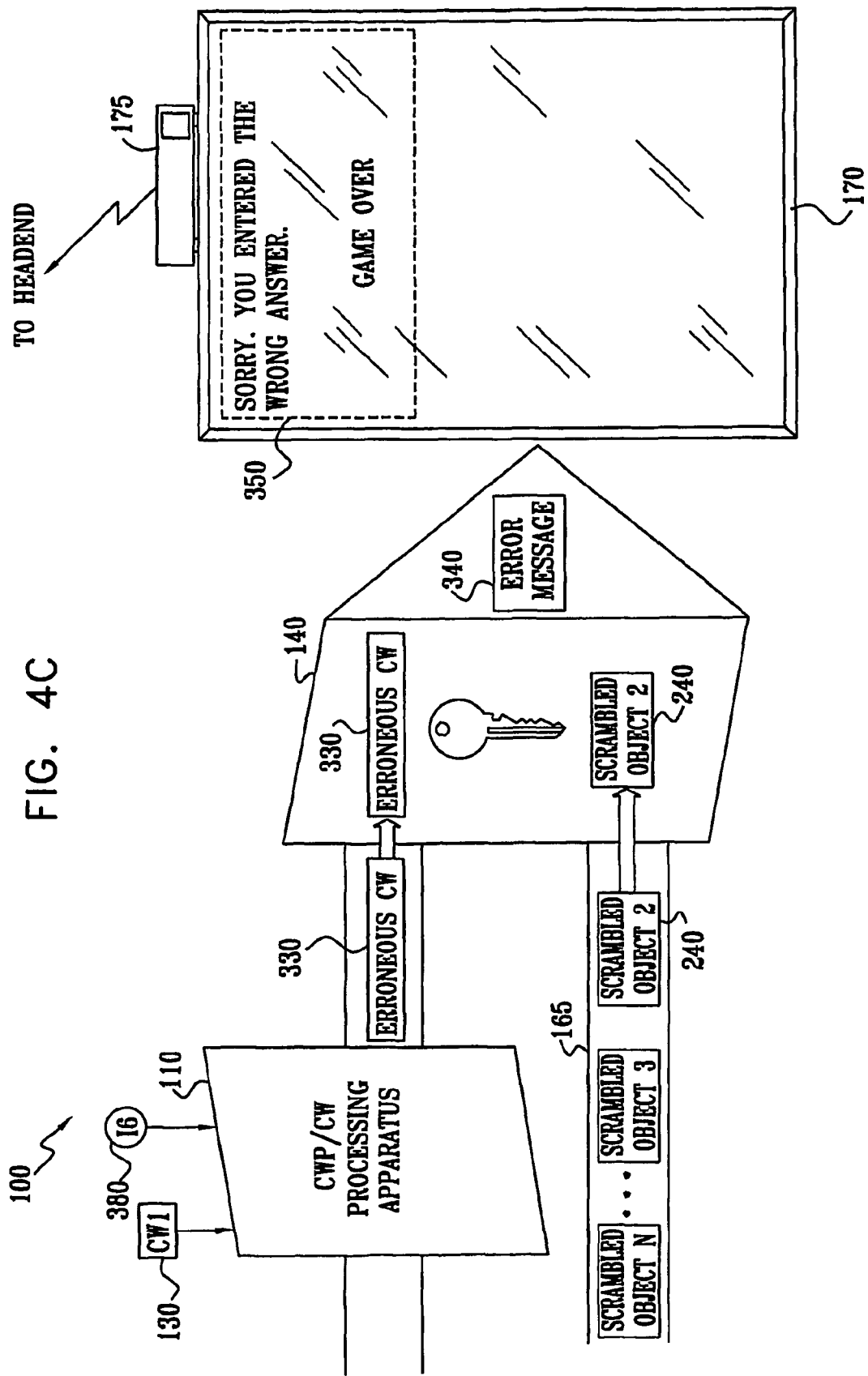
FIG. 4C is a simplified partly pictorial, partly block diagram illustration of the system of FIG. 4A, useful in understanding the operation thereof.

Reference is now additionally made to FIG. 4C which is a simplified partly pictorial, partly block diagram illustration of the system of FIG. 4A, useful in understanding the operation thereof.

FIGS. 4A-4C depict preferable operation of the system of FIG. 3A when the user inputs an incorrect response.

In FIG. 4A, the user sees the D01 180 which includes a question.

In FIG. 4B, the user uses the control device 190 by selecting at least one of the plurality of controls 200 to incorrectly respond to the question which is displayed on the TV 170.

FIG. 4C shows use of the user's incorrect response, a sixth input (I6) 380, to generate the erroneous CW 330. The erroneous CW 330 cannot unscramble the SO2 240 and the error message 340 is generated instead. The error message 340 is exclusively displayed on the TV 170 as the display error 350. Display error 350 is displayed instead of DO1 180 on the TV 170.

FIGS. 4A-4C operate on the same principles as FIGS. 2A-2C with the exception that each display object is exclusively displayed on the TV 170. In FIGS. 4A-4C, each successive display object is output on the TV 170 instead of the display object which had previously been displayed. In FIGS. 2A-2C, by contrast, all descrambled objects are accumulatively displayed.

It is further appreciated that in FIGS. 4A-4C, the user being unable to proceed in the displayed interactive application is by way of example only. It is appreciated that the user may enter an incorrect response and the application may continue. Because successive control word generation is based on CW1 130, all subsequent keywords can be generated, even when the previous control word was not generated. Even in the case where the first input is incorrect, CW1 can come from internal processing and subsequent control words can be generated.

Preferably, the user can continue even when an incorrect value is entered.

In FIG. 4C, the display error 350 is exclusively displayed on the TV 170. The DO3 310, which was previously displayed, no longer appears on the screen.

It is appreciated that the present invention, in the preferred embodiments as described above, may be used to implement a wide variety of applications, preferably including entertainment applications.

For example, and without limiting the generality of the foregoing: in a sports application, objects, representing elements of a sports event to be shown on a TV screen, might be revealed one at a time in response to correct user inputs. It is further appreciated that a price or a prize might be associated with such an application; for example, and without limiting the generality of the foregoing, a user who answered all questions correctly might be excused from payment, or a user who answered less than a predetermined minimum of questions correctly might be required to make a higher than normal payment.

It is appreciated that in the present invention, in the preferred embodiments as described above, in place of a control word packet, a first control word can be a first input to the CWP/CW processing apparatus which begins the iterative generation of subsequent control words.

In another non-limiting example of an application which might be implemented using the preferred embodiments described above, a first CW derived from a CWP might be used to enable display of, for example, a movie or a portion thereof. Second and subsequent CWs, produced as described above, might be used for an interactive application, including, for example, one or more screen overlays, associated with the movie.

It is appreciated that, in various preferred embodiments, the present invention, which preferably utilizes one CWP to generate many CWs for controlling objects, may save an ample amount of bandwidth when compared to a prior art system which would require one CWP for each CW.

Figure 5:
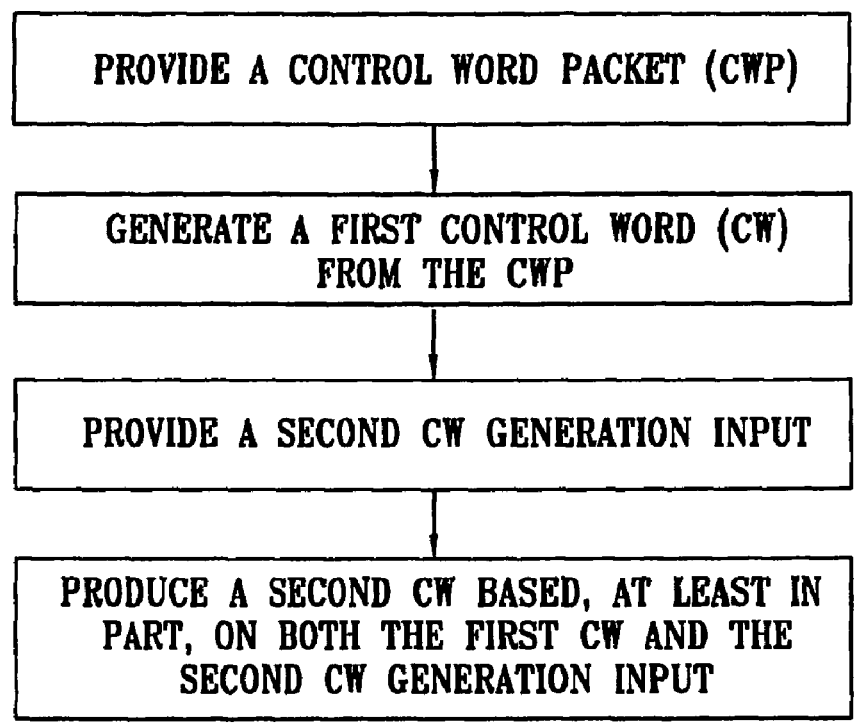
FIG. 5 is a simplified flowchart illustration of a preferred method of operation of the systems of FIGS. 1A-1F, 2A-2C, 3A-3F, and 4A-4C.

Reference is now made to FIG. 5, which is a simplified flowchart illustration of a preferred method of operation of the systems of FIGS. 1A-1F, 2A-2C, 3A-3F, and 4A-4C. The method of FIG. 5 is self-explanatory with reference to the above description of FIGS. 1A-1F, 2A-2C, 3A-3F, and 4A-4C.

Figure 6:
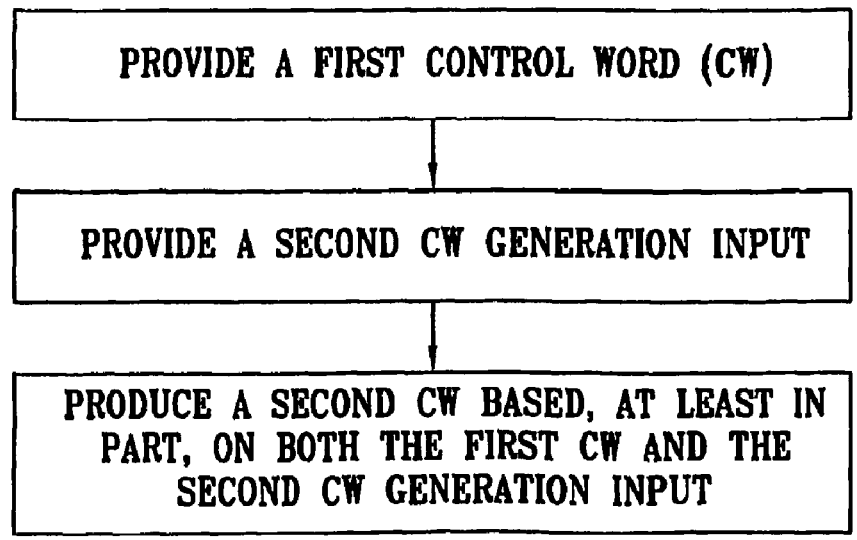
FIG. 6 is a simplified flowchart illustration of an alternative preferred method of operation of the systems of FIGS. 1A-1F, 2A-2C, 3A-3F, and 4A-4C.

Reference is now made to FIG. 6, which is a simplified flowchart illustration of a preferred method of operation of the systems of FIGS. 1A-1F, 2A-2C, 3A-3F, and 4A-4C. The method of FIG. 6 is self-explanatory with reference to the above description of FIGS. 1A-1F, 2A-2C, 3A-3F, and 4A-4C.

Figure 7:
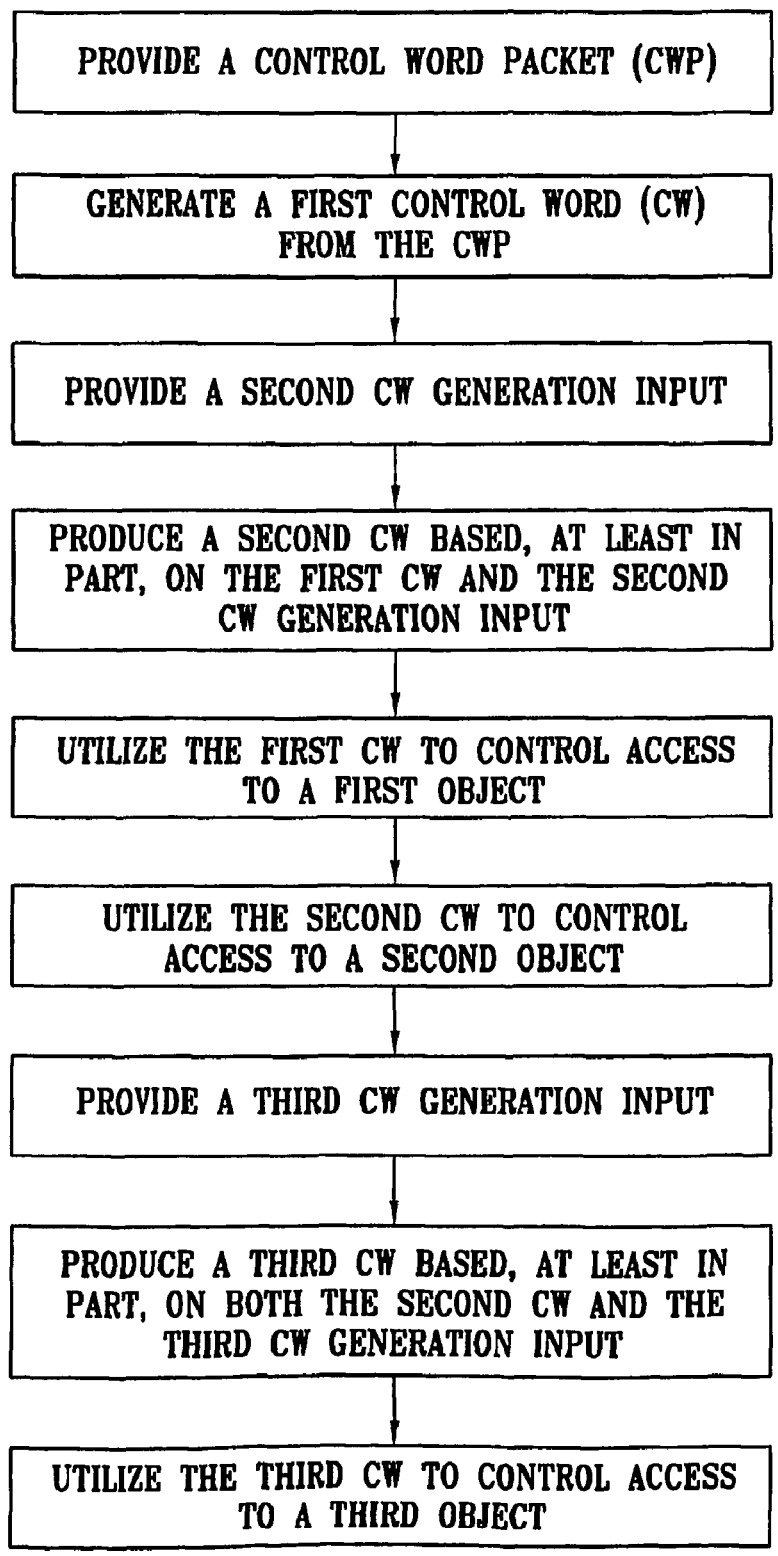
FIG. 7 is a simplified flowchart illustration of a further alternative preferred method of operation of the systems of FIGS. 1A-1F and 3A-3F.

Reference is now made to FIG. 7, which is a simplified flowchart illustration of a preferred method of operation of the systems of FIGS. 1A-1F and 3A-3F. The method of FIG. 7 is self-explanatory with reference to the above description of FIGS. 1A-1F and 3A-3F.

Figure 8:
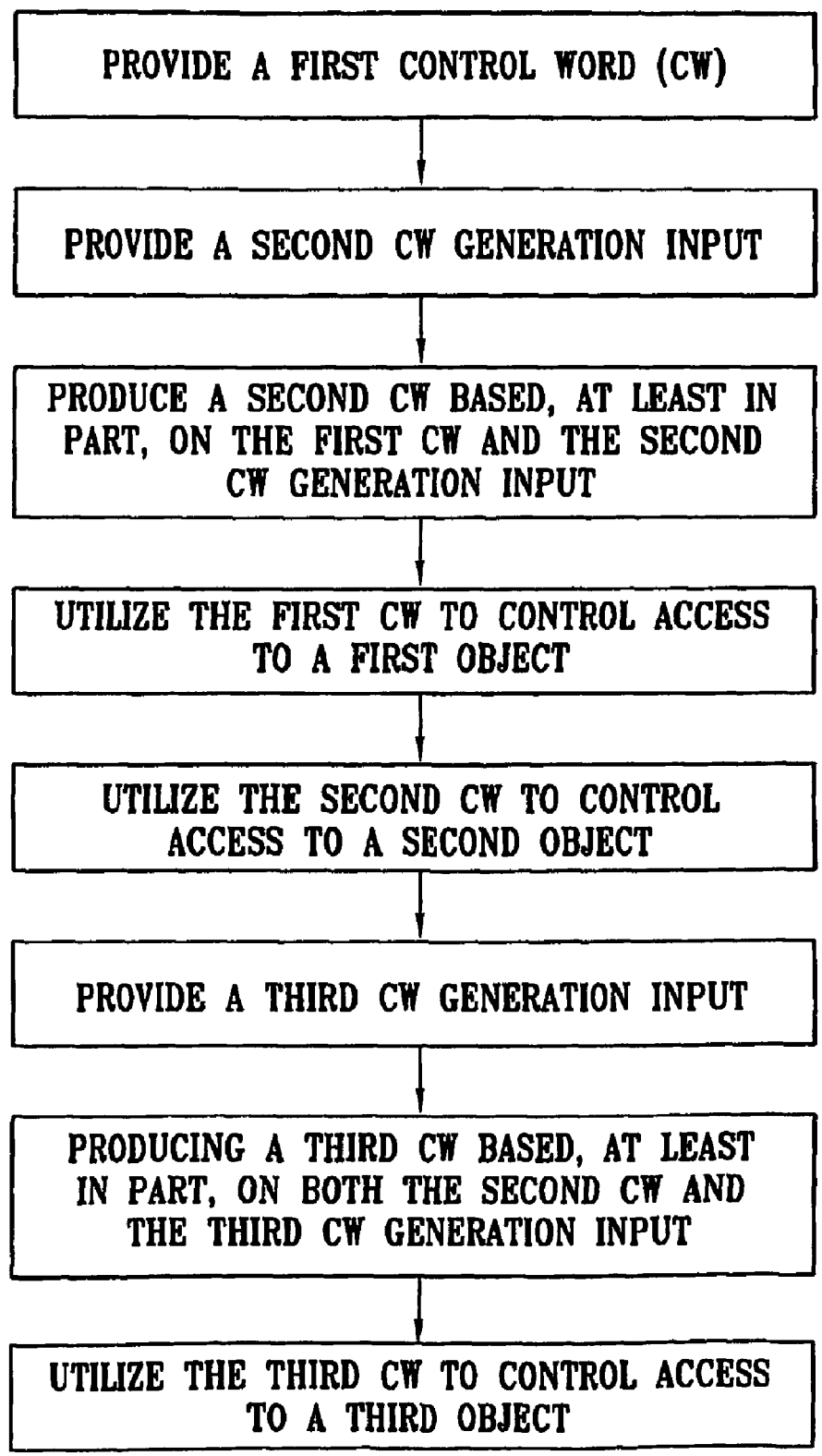
FIG. 8 is a simplified flowchart illustration of a still further alternative preferred method of operation of the systems of FIGS. 1A-1F and 3A-3F.

Reference is now made to FIG. 8, which is a simplified flowchart illustration of a preferred method of operation of the systems of FIGS. 1A-1F and 3A-3F. The method of FIG. 8 is self-explanatory with reference to the above description of FIGS. 1A-1F and 3A-3F.

Figure 9:
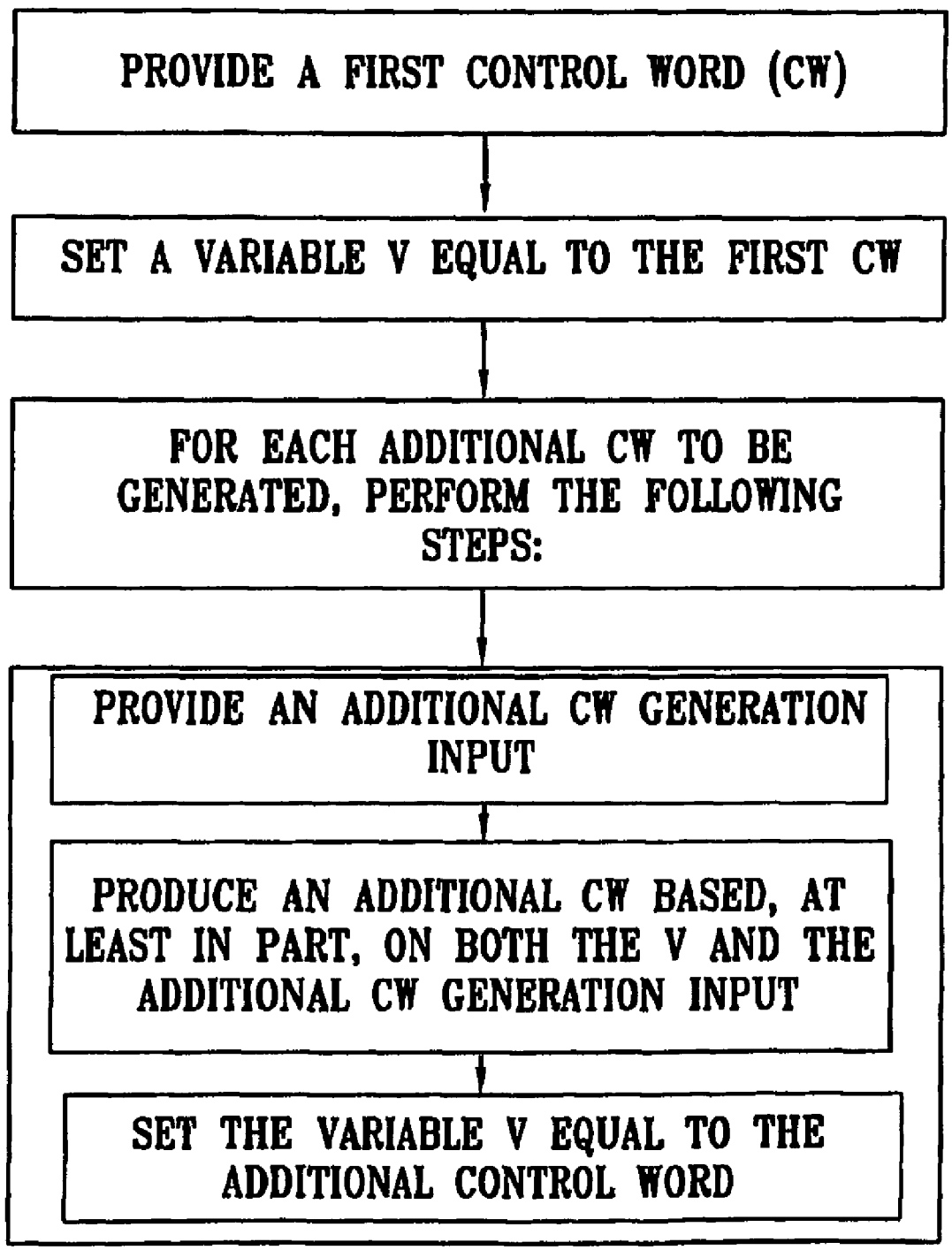
FIG. 9 is a simplified flowchart illustration of another alternative preferred method of operation of the systems of FIGS. 1A-1F and 2A-2C.

Reference is now made to FIG. 9, which is a simplified flowchart illustration of a preferred method of operation of the systems of FIGS. 1A-1F and 2A-2C. The method of FIG. 9 is self-explanatory with reference to the above description of FIGS. 1A-1F and 2A-2C.

Figure 10:
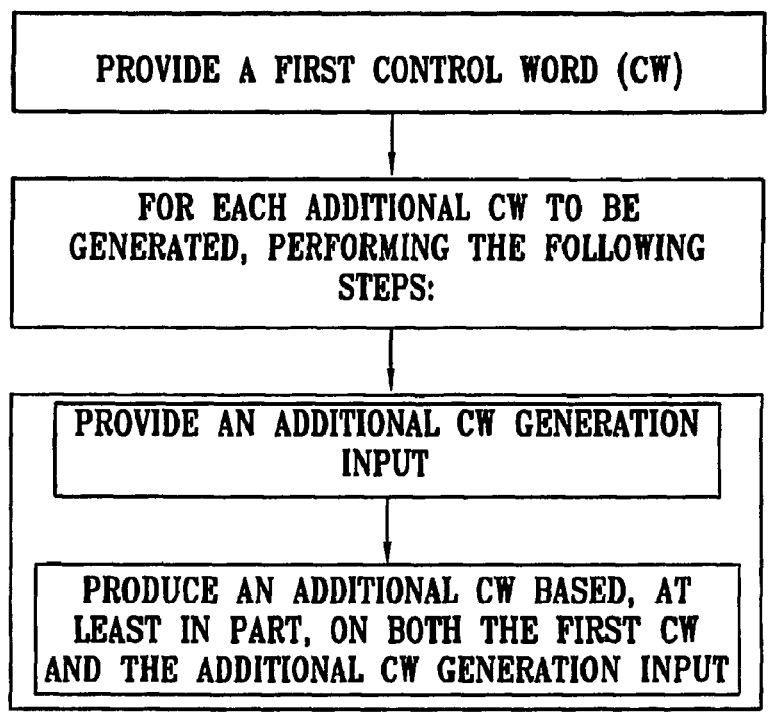
FIG. 10 is a simplified flowchart illustration of a further alternative preferred method of operation of the systems of FIGS. 3A-3F and 4A-4C.

Reference is now made to FIG. 10, which is a simplified flowchart illustration of a preferred method of operation of the systems of FIGS. 3A-3F and 4A-4C. The method of FIG. 10 is self-explanatory with reference to the above description of FIGS. 3A-3F and 4A-4C.

Figure 11:
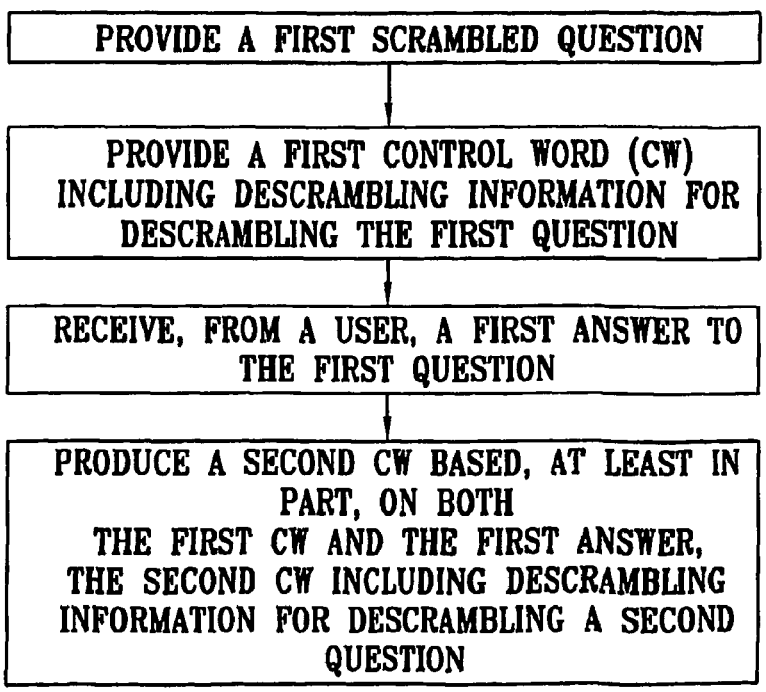
FIG. 11 is a simplified flowchart illustration of another alternative preferred method of operation of the systems of FIGS. 1A-1F and 3A-3F.

Reference is now made to FIG. 11, which is a simplified flowchart illustration of a preferred method of operation of the systems of FIGS. 1A-1F and 3A-3F. The method of FIG. 11 is self-explanatory with reference to the above description of FIGS. 1A-1F and 3A-3F.

It is appreciated that, in typical CA systems known in the art, the CW changes according to a predetermined schedule in which there is one CW for every "key period". It is known in the art, for example, to have a 10 second key period and to transmit a plurality of CWPs, each CWP being associated with the same CW, during the key period; often, each CWP transmitted during a given key period is identical to each other CWP transmitted during that key period.

It is therefore appreciated that, in some preferred embodiments of the present invention, there may be a different CWP for each key period. In such preferred embodiments, correct inputs that were used to generate objects during a first key period are preferably saved in the smart card's memory. These saved values may then be used, in a second key period, together with the new CWP, as explained above, to generate a corresponding sequence of CWs, which are then used to regenerate the previously displayed objects.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination. For example exclusive display of objects on the TV 170 can be implemented independently of successive control word generation using the CW1 130 as one of its inputs as discussed in FIGS. 3A-3F.

It will be appreciated by persons skilled in the art that the present invention is not limited by what has been particularly shown and described hereinabove. Rather the scope of the invention is defined only by the claims which follow:

What is claimed is:

1. A method for providing a multiple-question game, the method comprising:
   providing a first scrambled question;
   providing a first control word (CW) including descrambling information for descrambling the first question;
   receiving, from a user, a first answer to the first question; and
   producing a second CW using a control word processor, the control word processor being implemented at least partly in hardware, the second CW being based, at least in part, on both of the following:
   the first CW and the first answer,
   the second CW including descrambling information for descrambling a second question.

2. The method according to claim 1 and wherein at least one of the first question and the second question comprises a plurality of questions.

3. Game apparatus for providing a multiple-question game, the apparatus comprising:
   a scrambled question descrambler receiving a first scrambled question and a first control word (CW) including descrambling information for descrambling the first question and operative to descramble the first question; and
   a control word processor receiving, from a user, a first answer to the first question and operative to produce a second CW based, at least in part, on both of the following:
   the first CW and the first answer,
   the second CW including descrambling information for descrambling a second question,
   the control word processor being implemented at least partly in hardware.

4. The apparatus according to claim 3 and also comprising a security subsystem, and
   wherein the security subsystem comprises at least one of the following: the scrambled question descrambler; and the control word processor.

5. The apparatus according to claim 4 and wherein the security subsystem comprises a removable security element, and the removable security element comprises at least one of the following: the scrambled question descrambler; and the control word processor.

6. The apparatus according to claim 5 and wherein the removable security element comprises a smart card.

7. Game apparatus for providing a multiple-question game, the apparatus comprising:
- scrambled question descrambling means for receiving a first scrambled question and a first control word (CW) including descrambling information for descrambling the first question and operative to descramble the first question; and
- a control word processor for receiving, from a user, a first answer to the first question and operative to produce a second CW based, at least in part, on both of the following:
  - the first CW and the first answer,
  - the second CW including descrambling information for descrambling a second question, the control word processor being implemented at least partly in hardware.

8. The method according to claim 1 and wherein the control word processor comprises a removable security element.

9. The method according to claim 8 and wherein the removable security element comprises a smart card.

10. The apparatus according to claim 3 and wherein the control word processor comprises a removable security element.

11. The apparatus according to claim 10 and wherein the removable security element comprises a smart card.

12. The apparatus according to claim 7 and wherein the control word processor comprises a removable security element.

13. The apparatus according to claim 12 and wherein the removable security element comprises a smart card.

* * * * *